US007026957B2

(12) United States Patent
Rubenstein

(10) Patent No.: US 7,026,957 B2
(45) Date of Patent: Apr. 11, 2006

(54) APPARATUS FOR COMMUNICATING WITH A VEHICLE DURING REMOTE VEHICLE OPERATIONS, PROGRAM PRODUCT, AND ASSOCIATED METHODS

(75) Inventor: Jeffrey D. Rubenstein, Boynton Beach, FL (US)

(73) Assignee: Advanced Public Safety, Inc., Deerfield Beach, FL (US)

( * ) Notice: Subject to any disclaimer, the term of this patent is extended or adjusted under 35 U.S.C. 154(b) by 0 days.

(21) Appl. No.: 11/083,475

(22) Filed: Mar. 18, 2005

(65) Prior Publication Data
US 2005/0179540 A1  Aug. 18, 2005

Related U.S. Application Data

(63) Continuation-in-part of application No. 10/656,487, filed on Sep. 5, 2003, now Pat. No. 6,943,703, which is a continuation of application No. 09/968,633, filed on Oct. 1, 2001, now Pat. No. 6,621,422.

(51) Int. Cl.
G08G 1/123 (2006.01)

(52) U.S. Cl. .............. 340/988; 340/692; 340/995; 340/996; 707/10

(58) Field of Classification Search ........... 340/988, 340/692, 995, 996, 902, 933, 995.1, 995.12; 707/1–2, 10, 24, 200, 231, 246
See application file for complete search history.

(56) References Cited

U.S. PATENT DOCUMENTS

| 3,899,772 A | 8/1975 | Mead et al. |
| 4,083,003 A | 4/1978 | Haemmig |
| 4,152,693 A | 5/1979 | Ashworth, Jr. |
| 4,354,252 A | 10/1982 | Lamb et al. |
| 4,818,010 A * | 4/1989 | Dillon .............. 296/37.7 |
| 5,263,118 A | 11/1993 | Cornelison |
| 5,731,785 A | 3/1998 | Lemelson et al. |
| 6,035,016 A | 3/2000 | Moore |
| 6,049,272 A | 4/2000 | Lee et al. |
| 6,078,282 A | 6/2000 | Casey |
| 6,161,066 A | 12/2000 | Wright et al. |
| 6,173,284 B1 | 1/2001 | Brown |
| 6,188,939 B1 | 2/2001 | Morgan et al. |
| 6,317,684 B1 | 11/2001 | Roeseler et al. |
| 6,393,360 B1 | 5/2002 | Ma |

(Continued)

OTHER PUBLICATIONS

Advanced Public Safety (APS) brochure for "Virtual Partner", found at www.advancedpublicsafety.com.

(Continued)

Primary Examiner—Toan N. Pham
(74) Attorney, Agent, or Firm—Bracewell & Giuliani LLP

(57) ABSTRACT

An apparatus to enhance command communication in a high-noise environment between a user and user vehicle mobile data computer system, program product, and associated methods are provided. The apparatus includes a vehicle computer adapted to be positioned within a user vehicle and a vehicle computer application program stored in memory of the vehicle computer adapted to communicate with a remote host computer. A voice command interface program product is also stored in the memory and is in communication with the mobile data communications application program. The voice command interface program product is adapted to receive as audio input, through an audio input device, a voice command from the user representing a command input, identify the voice command by analyzing the received audio input, echo the identified voice command through an audio speaker, and transmit the command input to the vehicle computer application program, the echo including a preselected audio message verbally representing the identified voice command.

6 Claims, 12 Drawing Sheets

U.S. PATENT DOCUMENTS

| | | | |
|---|---|---|---|
| 6,408,304 B1 | 6/2002 | Kumhyr | |
| 6,621,422 B1 | 9/2003 | Rubenstein | |
| 2004/0059582 A1* | 3/2004 | Kumhyr | 704/275 |

OTHER PUBLICATIONS

W. Thomas Miller, III, report titled "P54 Messenger: A simple program for testing Project54 application messaging," posted on Nov. 19, 2004, found at www.project54.unh.edu/documents/Technical Reports.

Laslo Turner, report titled "Data Wizard," posted on Oct. 29, 2004, found at www.project54.unh.edu/documents/Technical Reports.

Laslo Turner, report titled "Data Wizard—Install*Upgrade," posted on Oct. 30, 2004, found at www.project54.unh.edu/documents/Technical Reports.

Laslo Turner, report titled "Download Wizard," posted on Oct. 29, 2004, found at www.project54.unh.edu/documents/Technical Reports.

Prescott B. Atkinson, report titled "Integration of the Blaupunkt RC-10 infrared remote control with the Project54 system," posted on Oct. 1, 2004, found at www.project54.unh.edu/documents/Technical Reports.

W. Thomas Miller, III, report titled "Overview of Project54 inter-application messaging: Local and distributed messaging architectures," posted on Sep. 30, 2004, found at www.project54.unh.edu/documents/Technical Reports.

Michael E. Martin, report titled "Review of operational Project54 systems in local departments," posted on Sep. 2, 2004, found at www.project54.unh.edu/documents/Technical Reports.

Florent Rivreau, report titled "A prototype home automation project using the Project54 system," posted on Sep. 1, 2004, found at www.project54.unh.edu/documents/Technical Reports.

Kriste Krstovski, report titled "The Scanner Application for the mobile Project54 software system," posted on Jul. 20, 2004, found at www.project54.unh.edu/documents/Technical Reports.

Laslo Turner, report titled "The Constructor V2.1 (Radio Wizard++)," posted on Jul. 19, 2004, found at www.project54.unh.edu/documents/Technical Reports.

Laslo Turner, report titled "The AppList Wizard (V2.1 )," posted on Jun. 29, 2004, found at www.project54.unh.edu/documents/Technical Reports.

Kriste Kristovski, report titled "Driver's License Scanner Pocket PC Application," posted on Feb. 26, 2004, found at www.project54.unh.edu/documents/Technical Reports.

Laslo Turner, report titled "Using .NET with Project54," posted on Feb. 9, 2004, found at www.project54.unh.edu/documents/Technical Reports.

Laslo Turner, report titled "The Constructor (Radio Wizard++)," posted on Jan. 24, 2004, found at www.project54.unh.edu/documents/Technical Reports.

Laslo Turner, report titled "The Architect (Installation Wizard++)," posted on Jan. 23, 2004, found at www.project54.unh.edu/documents/Technical Reports.

Ian J. Miller, report titled "Project54 Application Tutorial," posted on Jan. 16, 2004, found at www.project54.unh.edu/documents/Technical Reports.

Richard L. Lynch, report titled "The SpeechBot," posted on Jul. 11, 2003, found at www.project54.unh.edu/documents/Technical Reports.

Richard L. Lynch, report titled "Speech recognition engine comparision," posted on Jul. 10, 2003, found at www.project54.unh.edu/documents/Technical Reports.

Richard L. Lynch, report titled "Using SAPI5 XML text to speech tags," posted on Jul. 9, 2003, found at www.project54.unh.edu/documents/Technical Reports.

Richard L. Lynch, report titled "Installing and using SAPI15 in Project 54," posted on Jul. 8, 2003, found at www.project54.unh.edu/documents/Technical Reports.

Richard L. Lynch, report titled " Generic SAPI4 grammar file converter," posted on Jul. 3, 2003, found at www.project54.unh.edu/documents/Technical Reports.

Kent Chamberlin and Maxim Khankin, report titled "EMI testing of the police cruiser equipment," posted on Jul. 2, 2003, found at www.project54.unh.edu/documents/Technical Reports.

Kent Chamberlin, report titled "Communications coverage-area modeling task," posted on Jul. 1, 2003, found in www.project54.unh.edu/documents/Technical Reports.

Jeremy Saunders, report titled "Remote access to the Project54 system," posted on Jun. 4, 2003, found at www.project54.unh.edu/documents/Technical Reports.

Albert Pelhe, Andrew L. Kun and W. Thomas Miller, III, report titled "Project54 system software architecture—Version 2," posted on May 6, 2003, found at www.project54.unh.edu/documents/Technical Reports.

W. Thomas Miller, III, report titled "Run-time error messages in the Records.dll Project54 application," posted on Apr. 17, 2003, found at www.project54.unh.edu/documents/Technical Reports.

Laslo Turner, report titled "The Project54 Installation Wizard)," posted on Apr. 16, 2003, found at www.project54.unh.edu/documents/Technical Reports.

Laslo Turner, report titled "The Project54 AppList Wizard," posted on Apr. 15, 2003, found at www.project54.unh.edu/documents/Technical Reports.

Laslo Turner, report titled "Retrieving data using a handheld 2d bar-code scanner—The Records Application update," posted on Apr. 14, 2003, found at www.project54.unh.edu/documents/Technical Reports.

W. Thomas Miller, III, report titled "Remote Project54 application messaging via the Proxy Application," posted on Mar. 25, 2003, found at www.project54.unh.edu/documents/Technical Reports.

W. Thomas Miller, III, report titled "Project54 client/server application messaging," posted on Mar. 24, 2003, found at www.project54.unh.edu/documents/Technical Reports.

W. Thomas Miller, III, report titled "Project54 Application Manager messaging," posted on Mar. 23, 2003, found at www.project54.unh.edu/documents/Technical Reports.

Richard L. Lynch and Andrew L. Kun, report titled "Enhanced Speech Recognition Evaluation Program (E-SREP)," posted on Mar. 12, 2003, found at www.project54.unh.edu/documents/Technical Reports.

Dragan Vidacic, report titled "Project54 IDC video software module," posted on Nov. 15, 2002, found at www.project54.unh.edu/documents/Technical Reports.

Pavlo B. Melnyk, report titled "Integrating the "Crown Victoria Video Solution" model SVS-5.2 video system into the Project54 in-car network," posted on Nov. 14, 2002, found at www.project54.unh.edu/documents/Technical Reports.

Laslo Turner, report titled "Prototype 2D-Barcode (PDF417) Scanning System," posted on Sep. 27, 2002, found at www.project54.unh.edu/documents/Technical Reports.

Brett J. Vinciguerra, report titled "Project54 Speech Recognition Evaluation Program," posted on Aug. 19, 2002, found at www.project54.unh.edu/documents/Technical Reports.

Nevenka Kozomora, report titled "Radar Application for Stalker DSR Radar Unit," posted on Jul. 18, 2002, found at www.project54.unh.edu/documents/Technical Reports.

Pavlo B Melnyk and Richard A. Messner, report titled "Police car digital video system," posted on Jul. 17, 2002, found at www.project54.unh.edu/documents/Technical Reports.

Dragan Vidacic, report titled "Software modifications for the Project54 Common IDB Interface," posted on Jul. 1, 2002, found at www.project54.unh.edu/documents/Technical Reports.

Nevenka Kozomora, report titled "Radar Application for the Golden Eagle Radar," posted on Jul. 1, 2002, found at www.project54.unh.edu/documents/Technical Reports.

John H. Mock, report titled "Updated Voice over IP solution for mobile radio interoperability," posted on Jun. 29, 2002, found at www.project54.unh.edu/documents/Technical Reports.

Michael E Martin, report titled "Progress report on the Project54 Common IDB Interface," posted on Jun. 28, 2002, found at www.project54.unh.edu/documents/Technical Reports.

Kent Chamberlin, Maxim Khankin and Dragan Vidacic, report titled "Preliminary EMI testing of the Project54 police crusier equipment," posted on Jun. 28, 2002, found at www.project54.unh.edu/documents/Technical Reports.

Borislav Batinic, report titled "Radio Control Application," posted on Jun. 28, 2002, found at www.project54.unh.edu/documents/Technical Reports.

Albert Pelhe, report titled "The new Project54 Application Manager," posted on Jun. 23, 2002, found at www.project54.unh.edu/documents/Technical Reports.

Kent Chamberlin and Maxim Khankin, report titled "Communications Coverage-Area Modeling Task," posted on Jan. 29, 2002, found at www.project54.unh.edu/documents/Technical Reports.

John H. Monk, report titled "A Voice Over IP Solution to Radio Interoperability," posted on Jan. 18, 2002, found at www.project54.unh.edu/documents/Technical Reports.

Nevenka Kozomora, report titled "Radar Application ," posted on Jan. 17, 2002, found at www.project54.unh.edu/documents/Technical Reports.

Brett J. Vinciguerra, report titled "Speech Recognition Test Program Documentation," posted on Jan. 11, 2002, found at www.project54.unh.edu/documents/Technical Reports.

Albert Pelhe, report titled "The Project54 Records Application," posted on Jan. 11, 2002, found at www.project54.unh.edu/documents/Technical Reports.

Batinic Borislav, report titled "Integration of a police car radio into the system established by Project54," posted on Jan. 11, 2002, found at www.project54.unh.edu/documents/Technical Reports.

Michael E Martin, report titled "Common IDB Interface Software Updates," posted on Jan. 9, 2002, found at www.project54.unh.edu/documents/Technical Reports.

Michael E Martin, report titled "The Project54 Common Interface for the Intelligent Transportation Systems Data Bus Version 4," posted on Oct. 17, 2001, found at www.project54.unh.edu/documents/Technical Reports.

Nevenka Kozomora, report titled "Connecting the Golden Eagle traffic safety radar to the Project54 system ," posted on Sep. 20, 2001, found at www.project54.unh.edu/documents/Technical Reports.

Albert Pelhe and Dragan Vidacic, report titled "Connecting the Code 3 light bar and siren to the Project54 system," posted on Sep. 16, 2001, found at www.project54.unh.edu/documents/Technical Reports.

William H. Lenharth, W. Thomas Miller, III and Andrew L. Kun, article titled "*Human factor engineering and Project54*," 2005 Applied Ergonomics Conference, New Orleans, LA, Mar. 21-25, 2005, found at www.project54.uhn.edu/documents/PublishedPapers.

Kent Chamberlin and Dragan Vidacic, article titled "*Analysis of finite-differencing errors to determine cell size when modeling ferrites and other lossy electric and magnetic materials using FDTD*," IEEE Transactions on Electromagnetic Compatibility, vol. 46, Issue 4, pp.: 617-623, Nov. 2004, found at www.project54.uhn.edu/documents/PublishedPapers.

Andrew L. Kun, W. Thomas Miller, III and William H. Lenharth, article titled "*Computers in police cruisers*," IEEE Pervasive Computing, vol. 3, Issue 4, pp.: 34-41, Oct.-Dec. 2004, found at www.project54.uhn.edu/documents/Published Papers.

Kriste Krstovski, Andrew L. Kun and W. Thomas Miller, III, article titled "*Distributed components for retrieval of driver's license data using a handheld computer*," 8th IAESTED International Conference on Software Engineering and Applications (SEA'04), Cambridge, MA, Nov. 9-11, 2004, found at www.project54.uhn.edu/documents/PublishedPapers.

W. Thomas Miller, III, Andrew L. Kun and William H. Lenharth, article titled "*Consolidated Advanced Technologies for Law Enforcement Program*," IEEE Intelligent Transportation Systems Conference, Washington, DC, Oct. 3-6, 2004, found at www.project54.uhn.edu/documents/PublishedPapers.

Kriste Krstovski, Andrew L. Kun and W. Thomas Miller, III, article titled "*Speech interaction with handheld computers in the Project54 system*," 6th International Conference on Ubiquitous Computing (UbiComp'04), Electronic Adjunct Proceedings, Nottingham, England, Sep. 7-10, 2004, found at www.project54.uhn.edu/documents/PublishedPapers.

Laslo Turner and Andrew L. Kun, article titled "*Field testing the Project54 speech user interface*," NDIA Intelligent Vehicle Systems Symposium, Traverse City, MI, Jun. 22-24, 2004, found at www.project54.uhn.edu/documents/PublishedPapers.

Brett J. Vinciguerra, Andrew L. Kun, W. Thomas Miller, III, William H. Lenharth, Michael E. Martin and Richard L. Lynch article titled "*Integrated system of in-car devices with a speech user interface*," NDIA Intelligent Vehicle Systems Symposium, Traverse City, MI, Jun. 22-24, 2004, found at www.project54.uhn.edu/documents/PublishedPapers.

Andrew L. Kun, W. Thomas Miller, III, Albert Pelhe and Richard L. Lynch article titled "*A software architecture supporting in-car speech interaction*," IEEE Intelligent Vehicles Symposium, Parma, Italy, Jun. 14-17, 2004, found at www.project54.uhn.edu/documents/PublishedPapers.

Kent Chamberlin and Maxim Khankin, article titled "*Measuring the impact of-in-vehicle-generated EMI on VHF radio reception in an unshielded environment*," International Symposium on Electromagnetic Compatibility, Sendai, Japan, Jun. 1-4, 2004, found at www.project54.uhn.edu/documents/PublishedPapers.

Albert Pelhe, Nevenka Kozomora, Andrew L. Kun and W. Thomas Miller, III, article titled "*Distributed components in the Project54 system*," Workshop on Distributed Objects Research, Experiences & Applications (DOREA '04), Cancun, Mexico, Jan. 5-8, 2004, found at www.project54.uhn.edu/documents/PublishedPapers.

Albert Pelhe, Andrew L. Kun and W. Thomas Miller, III, article titled "*Project54 system software architecture*," Winter International Symposium on Information and Communication Technologies, Cancun, Mexico, Jan. 5-8, 2004, found at www.project54.uhn.edu/documents/PublishedPapers.

Andrew L. Kun, W. Thomas Miller, III, William H. Lenharth, Brett J. Vinciguerra and Michael E Martin, article titled "*An open architecture supporting telematics and the integration of in-car devices—a law enforcement application*," ITU Workshop on Standardization in Telecmmunication for motor vehicles, Geneva, Switzerland, Nov. 24-25, 2003, found at www.project54.uhn.edu/documents/PublishedPapers.

Andrew L. Kun, W. Thomas Miller, III and William H. Lenharth, article titled "*Project54: Standardizing electronic device integration in police cruisers*," IEEE Intelligent Systems, vol. 18, Issue 5, pp.: 10-13, Sep.-Oct. 2003, found at www.project54.uhn.edu/documents/PublishedPapers.

Brett J. Vinciguerra and Andrew L. Kun, article titled "*A comparision of commercial speech recognition components for use in police cruisers*," NDIA Intelligent Vehicle Systems Symposium, Traverse City, MI, Jun. 9-12, 2003, found at www.project54.uhn.edu/documents/PublishedPapers.

John H. Mock and W. Thomas Miller, III, article titled "*A voice over IP system to solve the problem of mobile radio interoperability*," Fall 2002 IEEE Conference on Technologies for Homeland Security, Boston, MA, Nov. 13-14, 2002, found at www.project54.uhn.edu/documents/PublishedPapers.

John H. Mock and W. Thomas Miller, III, article titled "*Voice over IP system for mobile radio interoperability*," IEEE Fall VTC2002, Vancouver,BC, Sep. 24-28, 2002, found at www.project54.uhn.edu/documents/PublishedPapers.

Andrew L. Kun, W. Thomas Miller, III and William H. Lenharth, article titled "*Modular system architecture for electronic device integration in police cruisers*," 2002 IEEE Intelligent Vehicle Symposium, Versailles, France, Jun. 18-20, 2002, found at www.project54.uhn.edu/documents/PublishedPapers.

Richard A. Messner and Pavlo B Melnyk, article titled "*Mobile digital video system for law enforecement*," IEEE Spring VTC2002, Birmingham, AL, May 6-9, 2002, found at www.project54.uhn.edu/documents/PublishedPapers.

Andrew L. Kun, W. Thomas Miller, III and William H. Lenharth, article titled "*Project54: Introducing advanced technologies in the police cruiser*," IEEE Spring VTC2002, Birmingham, AL, May 6-9, 2002, found at www.project54.uhn.edu/documents/PublishedPapers.

Michael E Martin, Francis C. Hludik and W. Thomas Miller, III, article titled "*The Project54 common interface for the Intelligent Transportation Systems Data Bus*," IEEE Spring VTC2002, Birmingham, AL, May 6-9. 2002, found at www.project54.unh.edu/documents/PublishedPapers.

Andrew L. Kun and Kadir Dogan, article titled "*A prototype remote access and mobile data transaction system for police cruisers* ," IEEE Spring VTC2002, Birmingham, AL, May 6-9, 2002, found at www.project54.uhn.edu/documents/PublishedPapers.

Laslo Turner, theses titled "*A Project54 speech user interface performance evaluation* ," posted on Jan. 20, 2005, found at www.project54.unh.edu/Documents/Theses.

Nevenka Kozomora, theses titled "*Modular system software architecture for the Pocket PC*," posted on Oct. 22, 2003, found at www.project54.unh.edu/Documents/Theses.

Dragan Vidacic, theses titled "*Assesment of FDTD model parameters for lossy media*," posted on Jul. 23, 2003, found at www.project54.unh.edu/Documents/Theses.

Albert Pelhe, theses titled "*One-to-one communication between objects in the Project54 system software*," posted on Jun. 16, 2003, found at www.project54.unh.edu/Documents/Theses.

Richard L. Lynch, theses titled "*AFARR: a framework for automatic speech recognition research*," posted on Jun. 13, 2003, found at www.project54.unh.edu/Documents/Theses.

Pavlo B Melnyk, theses titled "*Mobile digital video system for law enforcement*," posted on May 27, 2003, found at www.project54.unh.edu/Documents/Theses.

John H. Mock, theses titled "*A Voice over IP solution to the problem of mobile radio interoperability*," posted on May 21, 2003, found at www.project54.unh.edu/Documents/Theses.

Michael E Martin, theses titled "*Development of the Common Intelligent Transportation System Data Bus Interface for the Project54 System*," posted on Dec. 28, 2002, found at www.project54.unh.edu/Documents/Theses.

Anil K. Chintalapati, theses titled "*Layered driver architecture for network connectivity over a police radio*," posted on Dec. 20, 2002, found at www.project54.unh.edu/Documents/Theses.

Brett J. Vinciguerra, theses titled "*A comparision of commercial speech recognition components for use with the Project54 system*," posted on Aug. 6, 2002, found at www.project54.unh.edu/Documents/Theses.

Borislav Batinic, theses titled "*The integration of a police mobile radio into the Project54 system*," posted on Aug. 2, 2002, found at www.project54.unh.edu/Documents/Theses.

Kadir Dogan, theses titled "*A remote access and mobile data transaction system for the Project54 system*," posted on Sep. 1, 2001, found at www.project54.unh.edu/Documents/Theses.

Anthony Whitesell, theses titled "*Lightbar and siren interface for the Consolidated Advanced Technology for Law Enforcement Program*," posted on Sep. 1, 2001, found at www.project54.unh.edu/Documents/Theses.

Sam Tran, theses titled "*Kit Definition File development for Windows NT Embedded*," posted on Jun. 12, 2000, found at www.project54.unh.edu/Documents/Theses.

ANDREA Electronics Corporation, DA-350 Hands Free Linear Array Microphone specification sheet, found at www.andreaelectronics.com/automotive_aftermarket.htm.

ANDREA Electronics Corporation, DA-350 Hands Free Linear Array Microphone, microphone performance sheet, found at www.andreaelectronics.com/automotive_aftermarket.htm.

ANDREA Electronics Corporation, Digital Super Directional Array microphone specification sheet found at www.andreaelectronics.com/pdf_filingsDSDA_spec.pdf.

ScanSoft, Omniform.com, found at www.caere.com/products/omniform/.

Motorola, "Mobile Data Applications; Premier MDC™ Software, ", found at www.motorola.com/cgiss/mobile_apps.shtml.

Introduction slide show about Project 54, located at www.project54.unh.edu/overview/introduction/.

Pdf.document regarding Project 54, found at www.project54.unh.edu/.

Video demonstration about Project 54, found at www.project54.unh.edu/.

* cited by examiner

| Term | Assignment |
|---|---|
| WorkingDir | =C:\... \Install Files\... |
| PushToTalk_Delay | =400 |
| IPADict | =defensive |
| PushToTalk | =LEFT_CTRL |
| Play_Pushed | =C:\... \Sound Files\Blip1.wav |
| Play_Released | =C:\... \Sound Files\Blip2.wav |
| AlphabetStyle | =Alpha |
| echo | =C:\... \Sound Files\Letter-Number Sounds\ |

| Voice Command Terms | Audio Files | Keystrokes |
|---|---|---|
| "plate" | C:\... \Sound Files\Plate.wav | Alt-c,F4,F5,F11 |
| "clear" | C:\... \Sound Files\Clear.wav | Ctrl-A,Backspace,Backspace,Backspace,Backspace,Backspace,Backspace,Backspace,Backspace,Backspace,Backspace,Backspace,Alt-s |
| "send" | C:\... \Sound Files\Sending.wav | Alt-S |
| "cancel" | C:\... \Sound Files\Cancel.wav | Alt-C |
| "enroute" | | F8 |
| "arrival" | | F9 |
| "available" | | F10 |
| "backspace" | C:\... \Sound Files\Backspace.wav | Backspace |
| "dispatch" | C:\... \Sound Files\Dispatch.wav | F2,F2 |
| "crimes" | C:\... \Sound Files\Crimes.wav | Ctrl-Alt-F3 |
| "premier" | C:\... \Sound Files\Premier.wav | Ctrl-Alt-F4 |
| "mapping" | | TAB,F7 |
| "message" | | TAB,F4 |
| "citation" | | Ctrl-U |
| "gate code" | | Ctrl-G |
| "traffic stop" | | Ctrl-T |
| "local check" | | Ctrl-L |
| "self-initiated" | | F2,I |
| "new" | | Alt-T |
| "delete" | | Alt-D |
| "details" | | 3 |
| "close" | | c |
| "reply" | | R |
| "save" | | a |
| "yes" | | y |

FIG. 5A.

| Arabic Numeral | Set 1 (Alpha) | Set 2 (Adam) | Set N (***) |
|---|---|---|---|
| A | Alpha | Adam | *** |
| B | Bravo | Boy | *** |
| C | Charlie | Charlie | *** |
| D | Delta | David | *** |
| E | Echo | Edward | *** |
| F | Foxtrot | Frank | *** |
| G | Golf | George | *** |
| H | Hotel | Henry | *** |
| I | India | Ida | *** |
| J | Juliet | John | *** |
| K | Kilo | King | *** |
| L | Lima | Lincoln | *** |
| M | Mike | Mary | *** |
| N | November | Nora | *** |
| O | Oscar | Ocean | *** |
| P | Papa | Peter | *** |
| Q | Quebec | Queen | *** |
| R | Romeo | Robert | *** |
| S | Sierra | Sam | *** |
| T | Tango | Tom | *** |
| U | Uniform | Union | *** |
| V | Victor | Victor | *** |
| W | Whiskey | William | *** |
| X | X-ray | X-ray | *** |
| Y | Yankee | Young | *** |
| Z | Zulu | Zebra | *** |

*FIG. 5B.*

APPARATUS FOR COMMUNICATING WITH A VEHICLE DURING REMOTE VEHICLE OPERATIONS, PROGRAM PRODUCT, AND ASSOCIATED METHODS

CROSS REFERENCE TO RELATED APPLICATIONS

This application is a continuation-in-part of and claims the benefit of U.S. patent application Ser. No. 10/656,487, filed on Sep. 5, 2003, now U.S. Pat. No. 6,943,703, which is a continuation of and claims the benefit of U.S. patent application Ser. No. 09/968,633, filed on Oct. 1, 2001, now U.S. Pat. No. 6,621,422, both of which are incorporated herein by reference in their entirety.

BACKGROUND OF THE INVENTION

1. Field of the Invention

The present invention relates to the field of communications generally and, more particularly, to vehicle communication systems, program products, and associated methods.

2. Description of the Related Art

Law enforcement officers and other civil servants have long needed a cost-effective system which delivers data quickly, helps e.g., police officers save time in the performance of their duties, and accomplishes these goals without interfering with other officer duties or endangering the officer. Early officer data systems included human dispatchers in radio frequency ("RF") communication with officers in vehicles. In these early systems, data requested by the officer was typically searched for by hand and read back to the officer over the radio and, therefore, suffered from slow delivery of data, costs associated with employing dispatchers, and a very limited database of available data.

These early systems were gradually replaced by police department computer systems, typically including a main computer in a police department headquarters or control center in communication with a police vehicle mobile data computer and at least one law enforcement database, such as the system shown in U.S. Pat. No. 6,188,939, by Morgan et al. titled "Advanced Law Enforcement and Response Technology." Systems of this type use a handheld input device having a magnet stripe reader for filling in forms with data held on a magnet stripe located on cards such as driver's licenses, transmitting these forms to the vehicle mobile data computer, and printing out these forms on a printer positioned in the vehicle. The magnet stripe reader for reading driver's licenses poses an additional problem because the data obtained from the magnet stripe is often out of date, especially in states where licenses need not be renewed, and hence bar codes not being updated for many years. Further, the handheld unit required by such systems prevents the officer's hands from being free for other activities and can place the officer in dangerous situations such as when the officer's attention is devoted to the handheld unit instead of the officer's surroundings.

Some systems such as the Premiere MDC system sold by Motorola Corporation of Straumberg, Ill. have a police department computer in communication with a police vehicle mobile data computer and a database of law enforcement data. These systems offer computer aided dispatching, computer generated reports to be filled out by the officer, and can transmit responses to officer requests for law enforcement data such as data associated with license plate numbers or driver's licenses. The vehicle mobile data computer software in the Premiere MDC system has a limited text-to-voice program for presenting data in audio rather than video format and is also capable of displaying maps using a global positioning system ("GPS") unit to define the area to be displayed. The presentation of this data, however, is often poorly organized and poorly prioritized, thereby requiring the officer to spend a long time finding the desired data and distracting the officer from other work. The text-to-voice software from the Motorola system allows the officer to be somewhat more aware of the surroundings but still endangers the officer as critical data, such as whether a suspect is believed to be dangerous, may not come until the middle or end of the audio transmission.

Such systems conventionally transfer each element of written data or text-to-voice, e.g., including zip codes, extraneous information. Much of this information, however, is not needed by the officer and can be information overload for an officer. Further, because text-to-voice is typically monotone or lacking intonation, the officer must concentrate more attention on the transmission and may misunderstand portions of the transmission. Systems such as the Motorola system pose a still further problem because the officer must frequently focus attention on the computer screen while filling in forms and checking responses to queries. This substantially increases the danger to the officer as the officer cannot be aware of the surroundings at the same time.

Applicant recognized as beneficial in co-pending U.S. application Ser. No. 10/656,487 by Rubenstein titled "Apparatus for Communicating with Law Enforcement During Vehicle Travel and Associated Methods" and U.S. Pat. No. 6,621,422 by Rubenstein titled "Apparatus for Communicating with Law Enforcement During Vehicle Travel and Associated Methods," an apparatus and software for communicating with law enforcement during vehicle travel which: prioritizes pre-recorded human voice responses to officer queries that delivers rapid, easily comprehended responses that allow the officer to maintain visual awareness of the surroundings at all times; transmits audio alarms to the officer to give the officer immediate warning of degrees of law violation associated with a suspect; and provides cost effective quick mapping of incident locations. Such apparatus and software previously have been beneficially implemented in many vehicles.

Also with recent advances in computer technology, microphone technology, and speech recognition algorithms, there has been an emergence of speech recognition software capable of providing discrete word and phrase recognition. Speech recognition software generally receives a speech signal, determines which words constitute the speech signal, and apply the determined words to an application program either in the form of a command or in the form of text. Speech recognition systems generally compare an acoustic description of text stored in a vocabulary database against an acoustic signal generated by the utterance of the text to be recognized. The speech recognition system then determines if the words or text are commands vs. dictation, applying the words or text as commands if recognized as a command.

There are numerous problems encountered in the attempt to perfect speech recognition. For example, problems can include difficulty in determining when an utterance has begun. This problem is significantly exacerbated in a high-background noise environment. Some systems use a statistically derived acoustic model of background noise to filter the incoming acoustic signal. These systems have met some success where the non-speech sounds consist mostly of background noise having a fairly constant frequency and amplitude not matching the spectral characteristics of the text stored in the vocabulary database.

Nevertheless, non-speech sounds, including background noise, are frequently detected as speech. This condition is problematic because the speech recognition systems examine a very large database of words or text, attempting to match a detected sound to each word or text. As such, speech recognition systems are likely to be falsely triggered into interpreting non-speech sounds as speech. Even if the speech recognition system is able to differentiate between the non-speech sounds and desired speech, resources of the associated computer system can be heavily taxed during such determination, thus causing a significant delay to the user. This can cause the user to lose track of what speech was provided to the speech recognition system, distracting the user, and negating the benefit of using a speech recognition system.

Various vehicles, e.g., law enforcement or other public service vehicles, present an extremely high-background noise environment from multiple sources, such as, for example, the road, the engine, the wind, the vehicle fan, and the vehicle radio and/or passengers. Due to the level of such noise, the typical voice recognition system would be overwhelmed, causing extended delays as high as 20 seconds or more attempting to match the speech to be recognized with the vocabulary database. During a critical event such as, for example, a high-speed chase, distraction caused by either having to change focus to the computer screen to verify correct data entry or determining if the system received a command provided in the officer's speech, can significantly increase the likelihood of a traffic accident. Nevertheless, attempts have been made to implement a vehicle voice recognition system. Such a system is known as "Project 54."

Project 54, however, requires its own specialized hardware, hardware interface, and software package, which must be shipped or otherwise physically delivered to the vehicle. A vehicle electrician must then install the hardware interface and additional hardware, such as, for example, a press-to-talk switch that must be both connected to a vehicle structure and electrically interfaced with one of the ports of the vehicle computer. The vehicles mobile client software application must then be replaced with that of Project 54. The operator of the vehicle must then be trained to use the Project 54 mobile client and must memorize the voice commands utilized by the Project 54 software package.

The Applicant has recognized, however, that the various law-enforcement and other public service departments throughout the country have varying requirements, and prefer to utilize different mobile client software applications, generally having similar functionality, but controlled by different function keys. Such public service departments generally do not have the time or resources to perform vehicle modifications. Further, requiring the different departments to re-train their personnel in use of software having unfamiliar characteristics would require additional training expenditures, interrupt scheduling, and may cause operating difficulties, especially during initial implementation, which could result in an inability to receive critical information.

Also recognized by the Applicant is that Project 54, similar to the various speech recognition applications described previously, is extremely susceptible to noise signals encountered when the push-to-talk switch is engaged to allow the microphone to receive an audio signal, such as during delivery of a voice command. In such situations, the vehicle computer system resources can be heavily taxed while attempting to recognize the voice command, causing a significant delay in either recognizing the voice command or failing to do so. This can result in a severe distraction to the user. Further, the user is not provided a system ready status, and thus, may lose track of which voice command is being processed. As stated, such distractions negate the benefit of using voice recognition systems. Recognized by the Applicant is that such a system is wholly inadequate system for suppressing the effects of noise. The user must divert attention to the push-to-talk switch, provide voice commands during a relatively low-noise situation, and quickly release the switch to prevent extraneous noise from being received. Also recognized by the Applicant is that this limitation prevents the software from being operated in an entirely hands-free mode.

Thus, recognized by the Applicant is the need for a voice command interface program product or software compatible with a multitude of law-enforcement or other vehicle based mobile data systems that enables a user to utilize voice commands to operate the vehicle mobile data system, that requires little or no user training, and that has a very high accuracy under the most arduous conditions. Also recognized is that any voice command interface related system to be used for in-vehicle applications should be capable of not only enhancing the user's voice, but also eliminating background noise and minimizing the effect of other non-speech sounds.

SUMMARY OF THE INVENTION

With the foregoing in mind, embodiments of the present invention advantageously provide an apparatus, program product, and associated methods to communicate with a vehicle during vehicle travel that can enhance the flow of data to and from a vehicle driver or other user, such as a police officer. Embodiments of the present invention also provide an apparatus, including a voice command interface program product, that reduces the need to type commands into a computer and/or press keyboard keys or buttons that are difficult to access, especially when the vehicle is on the move. Embodiments of the present invention also provide an apparatus, including a voice command interface program product, that delivers audio feedback indicating the selection of a command input to a mobile data communications application program in the form of the voice command, returning the interpretation of the voice command so the vehicle user can determine if the command or text was interpreted correctly.

Advantageously, the voice command interface program product can provide voice command recognition and can deliver an echo of each spoken voice command, or a subset thereof, either in the form of text-to-speech or in the form of a pre-recorded human voice. Advantageously, this negates the need for the vehicle user to remove his/her hands from the steering wheel while driving or to shift focus from the outside environment in order to receive feedback. This functionality is particularly beneficial to law-enforcement. Unlike in other professions, a law-enforcement officer can be faced with situations, such as, for example, a high-speech chase or a vehicle stop, where even a momentary distraction causing the officer to focus visual attention on the computer can cause the officer to loose control of the situation, resulting in possible injury or death to either the officer or to a bystander.

Embodiments of the present invention advantageously provide an apparatus, including a voice command interface program product, to communicate with a user during vehicle travel which can: receive voice commands to operate vehicle computer application programs including those that can transmit queries to a remote computer; echo the identified voice commands in either text-to-voice or pre-recorded human voice, as pre-selected by a user; and prioritize pre-recorded human voice responses to the transmitted queries, summarizing the responses, thereby delivering rapid, easily comprehended responses that allow the user to maintain visual awareness of the surroundings at all times.

More particularly, embodiments of the present invention provide an apparatus to communicate with a user or users, e.g., law-enforcement, during remote vehicle operations that can enhance command communication, particularly in a high-noise environment. For example, in an embodiment of the present invention, an apparatus includes a vehicle mobile data computer system which includes a vehicle computer having memory to store data therein and adapted to be positioned within a user vehicle, such as, for example, a law enforcement or other civil service vehicle, to define a vehicle mobile data computer. The vehicle mobile data computer is in communication with a remote host computer, e.g., a department server, which is in communication with various external databases. When implemented with law enforcement, the remote host computer is in communication with law enforcement databases to supply law enforcement data to officers positioned in a law enforcement vehicle. The vehicle mobile data computer preferably uses radio frequency to transmit and to receive such data. The vehicle mobile data computer is also in communication with at least one but preferably a plurality of audio speakers and at least one audio input device. One or more vehicle mobile data computer application programs are stored in the memory of the mobile data computer. At least one of the vehicle mobile data computer application programs preferably is a mobile data communications application program adapted to communicate with the remote host computer through the vehicle mobile data computer, to thereby transmit and receive data through the remote host computer.

A voice command interface program product, stored in the memory of the vehicle mobile data computer and in communication with the vehicle mobile data communications application program, is provided to enhance user communication with the remote host computer through the mobile data computer. The voice command interface program product includes instructions to perform the operations of: receiving as audio input through the at least one audio input device a voice command from the user representing a command input; identifying the voice command by analyzing the received audio input; echoing the identified voice command through the at least one audio speaker; and transmitting or otherwise conveying the command input to the mobile data communications application program. The echo preferably includes a preselected audio message verbally representing the identified voice command. The audio message preferably include data representing or repeating the identified voice command in prerecorded human voice.

According to an embodiment of the present invention, an initializer is provided. The initializer is adapted to assign or provide assignment of a preferably very limited set of voice commands tailored to interface with various application programs for the vehicle mobile data computer system, e.g., a vehicle mobile data computer application program. Advantageously, when operated on a Windows® operating system, the initializer can be implemented by an initialization program or initialization text file, such as an ".ini" file, or data entered into the Windows® registry. Also, advantageously, the voice command interface program product is responsive only to limited sets of unique voice commands each of which function to emulate a correspondingly unique keyboard key press or series of keystrokes. The initialization file can provide a set of unique user-defined voice commands (e.g., "license plate" or "plate") assigned to a correspondingly unique set of keyboard keystrokes or series of keystrokes (e.g., "Alt-c, F4, F5, F11") to select an application program page, frame, text entry field, or other graphical user interface input. The initialization file can also assign the voice command interface program product to use a common spoken phonetic alphabet (e.g., "alpha" to "zulu" or "adam" to "zebra") equating to a keystroke for corresponding letters of the alphabet (e.g., "A" to "Z"), and Arabic numerals, e.g., "zero" to "nine" equating to a keystroke for corresponding numbers "0" to "9."

In the preferred embodiment of the present invention, only a specific set of user-defined or specified voice commands assigned or defined by an initializer, and/or those alphanumeric descriptions of individual keys associated with the vehicle mobile data computer keyboard, are compared for voice command recognition by the voice command interface program product. This is a significant feature that advantageously substantially improves voice command recognition accuracy and processing time, especially in a high-noise environment. Rather than comparing the received audio input to a large database of terms or phrases as is necessary with typical speech recognition programs, according to embodiment of the present invention, received audio input need only be compared to the specific commands necessary to operate each vehicle or public service department specific mobile data computer application or applications. Having such a limited vocabulary of voice commands and no dictation text to search advantageously reduces the probability that a noise signal will be interpreted as a voice command.

The apparatus further preferably includes a communication enhancing program product stored in the memory of the vehicle mobile data computer and in communication with the vehicle mobile data communications application program to enhance communication with the remote host computer through the vehicle mobile data computer. The communications enhancing program product is positioned to transmit enhanced audio data, e.g., law-enforcement data received from the vehicle mobile data communications application program, to the user through the at least one audio speaker. The enhanced audio data preferably includes a plurality of preselected and prerecorded audio messages that are processed and played in response to the audio data received from the vehicle mobile data communications program product to thereby summarize and prioritize messages forming the requested audio data.

Embodiments of the present invention also provide a method of enhancing command communication in a high-noise environment between a user and a user vehicle mobile data computer. For example, according to an embodiment of the present invention, a method includes providing a voice command interface program product particularly adapted to interface with a vehicle mobile data computer running a vehicle mobile data computer application program requiring command input by providing vehicle mobile data computer input device emulation. The method also includes providing an initializer preferably in the form of a program or initialization file accessible by the voice command interface program product and configured to assign each of a plurality of preferably customer or user specific/specified voice command terms or phrases, defining a plurality of vehicle mobile data computer application program voice commands, to a corresponding plurality of vehicle mobile data computer input device command inputs for the vehicle mobile data computer application program. The method also includes providing a plurality of phonetic alphabet data sets to provide command input of a plurality of letters corresponding to a plurality of vehicle mobile data computer input device inputs for the vehicle mobile data computer application program.

The method also includes assigning to at least some of the assigned voice commands, and/or assigned letters and numbers, an audio message in the form of an echo to acknowledge the voice command received from the user. The echo is preferably in the form of a prerecorded human voice message. The method can further include editing by the user the initializer to: assign an additional voice command terms or phrases to a corresponding vehicle mobile data computer input device input, in response to a modification of the vehicle mobile data computer application program; or edit a pre-assigned voice command assignment to change a name of a voice command, change the command input (keystrokes), or change the audio data associated with the voice command, in order to suit user preferences.

According to an embodiment of the present invention, another method can include accessing through an area network a user accessible web site or file server to "download" or otherwise receive a voice command interface program product that is adapted to provide vehicle mobile data computer input device emulation for a vehicle mobile data computer application program installed on a vehicle mobile data computer. The voice command interface program product advantageously can be provided and received by a user, preferably directly through the vehicle mobile data computer, in the form of a single self-extracting executable program including the voice command interface program product, negating the requirement for delivery of other more physically embodied computer readable media, e.g., a CD, in order to install the voice command interface program product. The self-extracting executable program preferably also can include an initializer which is adapted to assign a plurality of preferably user-specified voice commands to a correspondingly unique set of keyboard key command inputs, i.e. keystrokes or series of keystrokes. Advantageously, the initializer can be pre-tailored for a specific users needs prior to downloading or can be tailored by the user thereafter. The method further includes executing the self-extracting executable program, to thereby install each of a plurality of components of the voice command interface program product and the initializer in memory of the vehicle mobile data computer.

Preferably upon startup/initialization of a voice command interface program product, each of a plurality of user-tailored voice commands, to be received as audio input from an audio input device and a phonetic alphabet, are assigned to a corresponding keyboard key command input to interface the voice commands with a vehicle mobile data computer application program, provide command input to the vehicle mobile data computer application program. The numbers "zero" to "nine" equating to a keystroke for corresponding numerals "0" to "9" can also be assigned accordingly if not already done so in an operating system speech application program interface (SAPI). The initialization can also include assigning to at least some of the assigned voice commands, and/or assigned letters and numbers, an audio data message in the form of an echo, and preferably in the form of a prerecorded human voice message, to acknowledge the voice command received from the user.

Another method of enhancing command communication in a high-noise environment user and a user vehicle mobile data computer includes receiving voice commands and/or noise as audio input from the user through an audio input device, and identifying the voice commands by analyzing the received audio input. This is typically accomplished by performing an acoustic description comparison, or other analysis known to those skilled in the art, on or for the received audio input. The analysis is preferably only performed for a maximum of a predetermined or preselected time delay or timeout. Advantageously, this functionality allows quick recognition of the voice command not accompanied by excessive noise, and provides an ability to suppress a noise signal that would otherwise cause excessive use of processor resources and excessively delay a user's ability to convey a voice command, potentially distracting the user. This functionality also provides a time limitation for when a very low voice signal-to-noise ratio is encountered to allow the voice command to be repeated, if necessary, substantially without delay, rather than causing the user to be distracted while waiting for the processor to try and likely fail to identify the voice command from amongst the noise signal.

In an embodiment of the present invention, if a voice command is identified, and if an echo function is enabled and audio data is assigned to the respective voice command, the voice command (or representation thereof) is echoed through the vehicle or computer audio speakers and the command input (e.g., keyboard emulation) corresponding to the identified voice command is sent to the vehicle mobile data computer application program. The echo preferably includes a preselected audio message, preferably prerecorded in human voice, verbally repeating a representation of the voice command. When commanded to do so, the vehicle mobile data application program can either access vehicle memory or access a remote computer to receive request data. In another embodiment of the present invention, the functionality of either receiving audio input or transmitting further identified voice commands to the vehicle mobile data computer application program is automatically disabled if after a preselected time delay no voice commands are identified.

Embodiments of the present invention also include a computer readable medium that is readable by a computer to enhance command communication in a high-noise environment between user and a vehicle mobile data computer application program. For example, in an embodiment of the present invention, the computer readable medium includes a set of instructions that, when executed by a computer, such as, for example, vehicle mobile data computer cause the computer to perform the operations of: extracting data from an initializer configured to assign a plurality of user-specific or user-specified voice command terms or phrases, defining a plurality of vehicle mobile data computer application program voice commands to a corresponding vehicle mobile data computer input device command input (e.g., keyboard keystroke or keystrokes) for the vehicle mobile data computer application program; and assigning the plurality of vehicle mobile data computer application program voice commands, responsive to the extracted data, to corresponding vehicle mobile data keyboard key command inputs to interface the voice commands with the vehicle mobile data computer application program.

The instructions also include those to perform the operation of receiving audio input through an audio input device when in a high noise environment; and performing an acoustic description comparison on the received audio input, to thereby identify a set of preferably only the following voice commands: voice command terms assigned in the initializer, members of a phonetic alphabet associated to the initializer to provide command input of a plurality of letters each corresponding to separate keyboard key input, and a plurality of numbers each corresponding to a separate numerical keyboard key input, to identify each respective voice command, to thereby execute an associated vehicle mobile data computer application program command input.

Particularly with respect to law-enforcement, voice command recognition speed and accuracy is essential in order to prevent unwarranted distraction of an officer. Accordingly, by providing a very limited set of voice commands which are easy to assign and remember, the officer, even in a very high-stress situation, can easily convey, and the voice command interface program product can quickly recognize, all voice commands necessary to operate the mobile data communications application program or other application programs. Further, selection of the very limited set of necessary voice commands reduces the amount of system resources and time required to analyze the audio input.

According to another embodiment of the present invention, a computer readable medium includes instructions that, when executed by the vehicle mobile data computer, cause the computer to perform the operations of: receiving as audio input from the user through an audio input device, e.g., a stationary or wireless microphone, a voice command representing a vehicle mobile data computer application program command input; and identifying the voice command by analyzing the received audio input. The instructions also include those to perform the operations of: echoing the identified voice command through an audio speaker in response to identification of the received voice command and/or release of a push-to-talk control key; and transmitting the corresponding command input to the vehicle mobile data computer application program. The echo preferably includes preselected audio data associated with the identified voice command including a representation of the identified voice command, preferably in the form of prerecorded human voice audio message, verbalizing the representation of the identified voice command.

According to another embodiment of the present invention, a computer readable medium includes instructions that, when executed by a computer, e.g., the vehicle mobile data computer, cause the computer to perform the operations of: receiving through an audio input device audio input including a plurality of voice commands from the user; transmitting to the vehicle mobile data computer application program the plurality of voice commands from the user received as audio input; and disabling, responsive to a preselected time delay, transmitting the plurality of voice commands to the vehicle mobile data communications application program or receiving audio input from the audio input device.

According to another embodiment of the present invention, a computer readable medium includes instructions that, when executed by a computer, e.g., vehicle mobile data computer, cause the computer to perform the operations of: receiving an audio input from the user through an audio input device, e.g., a stationary or wireless microphone, that may or may not include a voice command representing a vehicle mobile data computer application program command input; and analyzing the received audio input to determine if the audio input includes a valid voice command from a user. The instructions also include those to perform the operation of rejecting the received audio input as including a voice command from the user after attempting to identify for a preselected or predetermined time period/delay period a valid assigned voice command. The instructions also include those to perform the operation of substantially immediately resuming awaiting receipt of a voice command in response to termination of the delay period. Advantageously, this functionality prevents the vehicle mobile data computer from excessively wasting system resources in order to attempt to identify either a noise signal as a voice command embedded among the noise signal or a voice command provided by the user but in such high noise environment that the voice command signal to noise ratio is extremely low, making identification of the voice command extremely difficult and unlikely. Advantageously, by quickly resetting to receive either an initial voice command or a repeat of a previously attempted voice command, the user is provided with less distraction and increased voice command identification reliability.

Advantageously, according to various embodiments of the present invention, the voice command interface program product functions entirely in the "background," without the need for direct user control. Also advantageously, the voice command interface program product integrates with various Microsoft® SAPI engines and is compatible with various Windows® operating systems including Windows 95, Windows 98, Windows ME, Windows 2000, Windows NT, and Windows XP. Advantageously, the program product installer can be written using a common installation program, such as, for example, the Wise Installation System, InstallShield, available through Wise Solutions, Inc., Plymouth, Mich. Preferably the program product installer can also install both the voice command interface program product and selected Microsoft® SAPI engine, along with a user editable initializer.

Also advantageously, both the voice command interface program product and initializer are "plug-and-play" capable, and thus, are immediately ready to function. After initial installation of the voice command interface program product, the user need not access any graphical user interface to utilize the functionality of the voice command interface program product. Microphone training can be accessed through either a voice command or a keystroke combination, but this need not be a prerequisite to immediate use. When used with a Windows® operating system, a system tray icon can be displayed to provide a ready visual reference of the operational status of the voice command interface program product, to thereby reduce any potential user confusion. Further, advantageously, a control selector, e.g., left control key or external input device switch, assignable by an initializer, e.g., a ".ini" file, can be provided to control whether the computer accepts audio (voice) input. Also advantageously, audio data, e.g., a short ".wav" file or files, can be assigned in the initializer to indicate manipulation of the control selector.

Still further, advantageously, the user may select various user-tailored configurations. For example, an "echo" can be selected or deselected for a specific command term or terms, and/or for letters or numbers. Also for example, the user can: add, modify, or delete voice command terms and their assigned keystroke combination; switch between phonetic alphabets; select or deselected key activation audio feedback; and assign or modify selection of a keyboard key to function as a push-to-talk key.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 5A is a table illustrating a portion of an initializer for initializing a voice command interface program product according to an embodiment of the present invention;

FIG. 5B is a table illustrating two phonetic alphabet examples assignable by the initializer of FIG. 5A according to an embodiment of the present invention;

DETAILED DESCRIPTION OF THE PREFERRED EMBODIMENTS

The present invention now will be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Particularly, various embodiments of the present invention have been found to be effectively implemented with civil service organizations such as, for example, law enforcement, and thus readily provide for enhanced illustrations and descriptions. Such embodiments, unless specifically stated as such, are not limited to such organizations. Like numbers refer to like elements throughout. Prime notation, if used, indicates similar elements in alternative embodiments.

As shown in FIGS. 1–12, embodiments of the present invention provide an apparatus for communicating with a user or users, e.g., law-enforcement, during remote vehicle operations that can enhance command communication particularly in a high-noise environment. According to embodiments of the present invention, the apparatus 30 can provide for both enhanced transmission of data and superior organization, prioritization, and delivery of requested data. Advantageously, the apparatus 30 is preferably designed to be used in conjunction with existing mobile data communications systems such as, for example, the Premier MDC system manufactured by the Motorola Corporation of Schaumberg, Ill.

Figure 1:
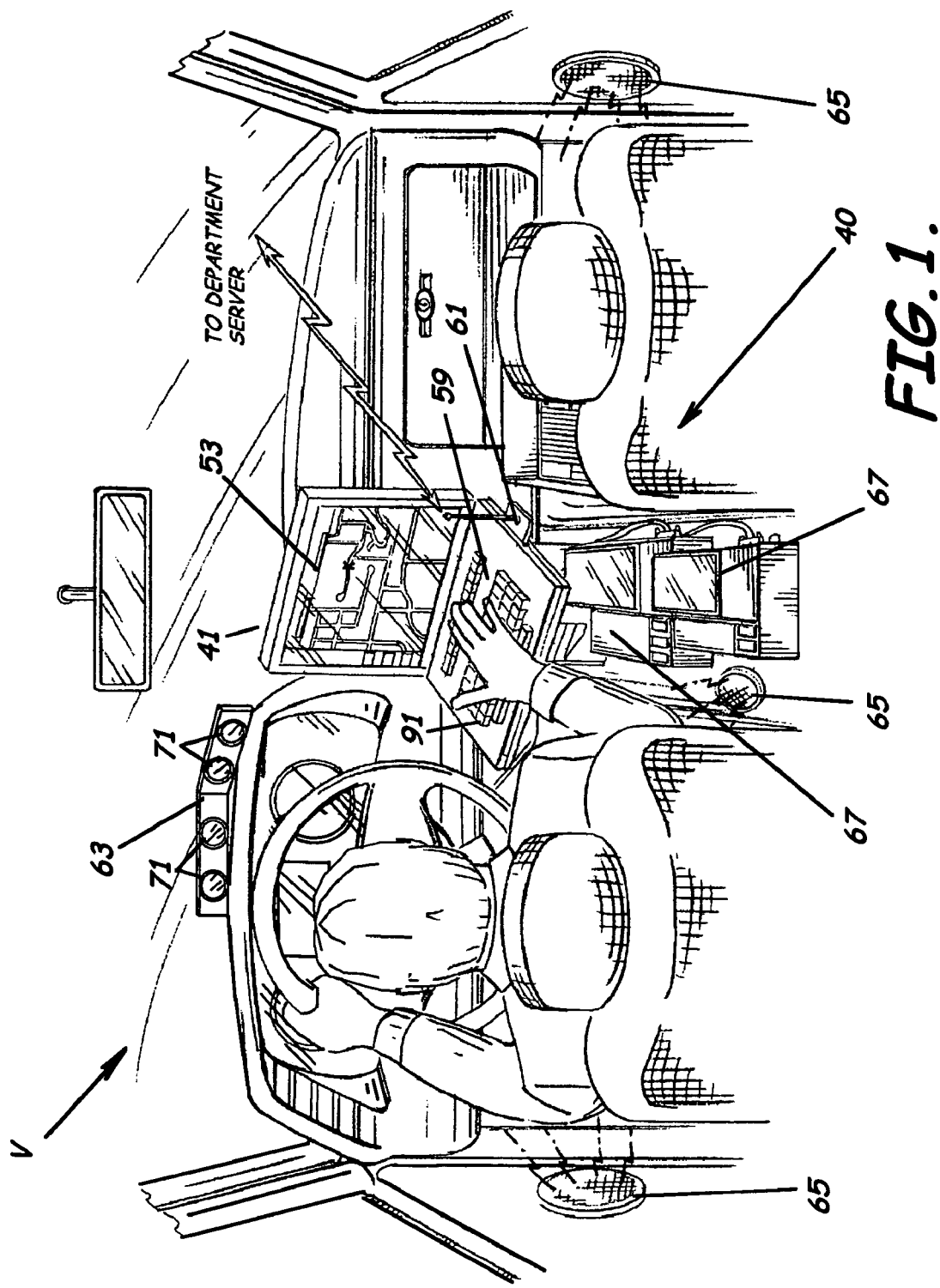
FIG. 1 is an environmental perspective view of a vehicle having an apparatus to enhance command communication in a high-noise environment between a user and user vehicle mobile data computer system according to an embodiment of the present invention.
Figure 2:
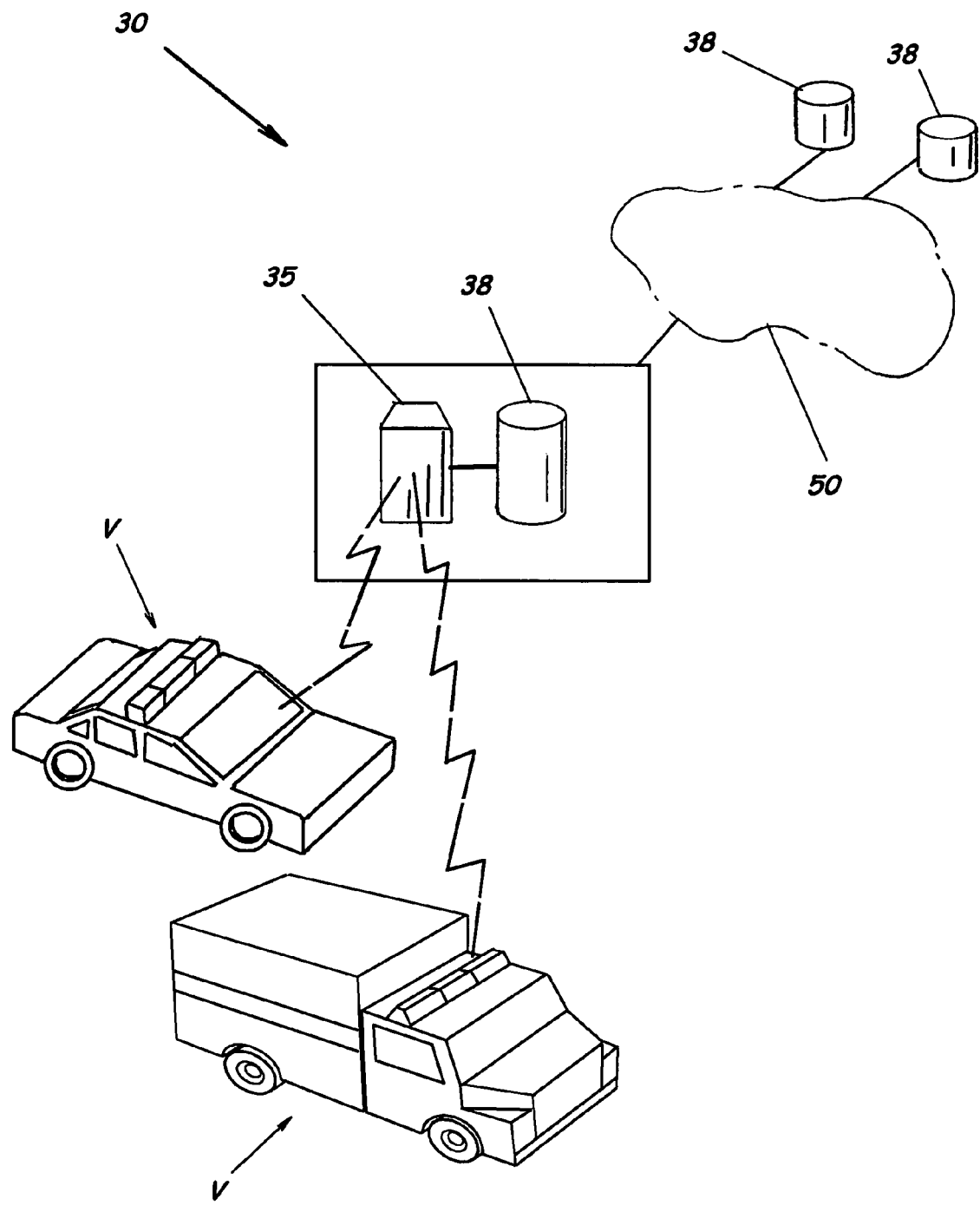
FIG. 2 is a schematic block diagram of an apparatus to enhance command communication in a high-noise environment between a user and user vehicle mobile data computer system according to an embodiment of the present invention.
Figure 3A:
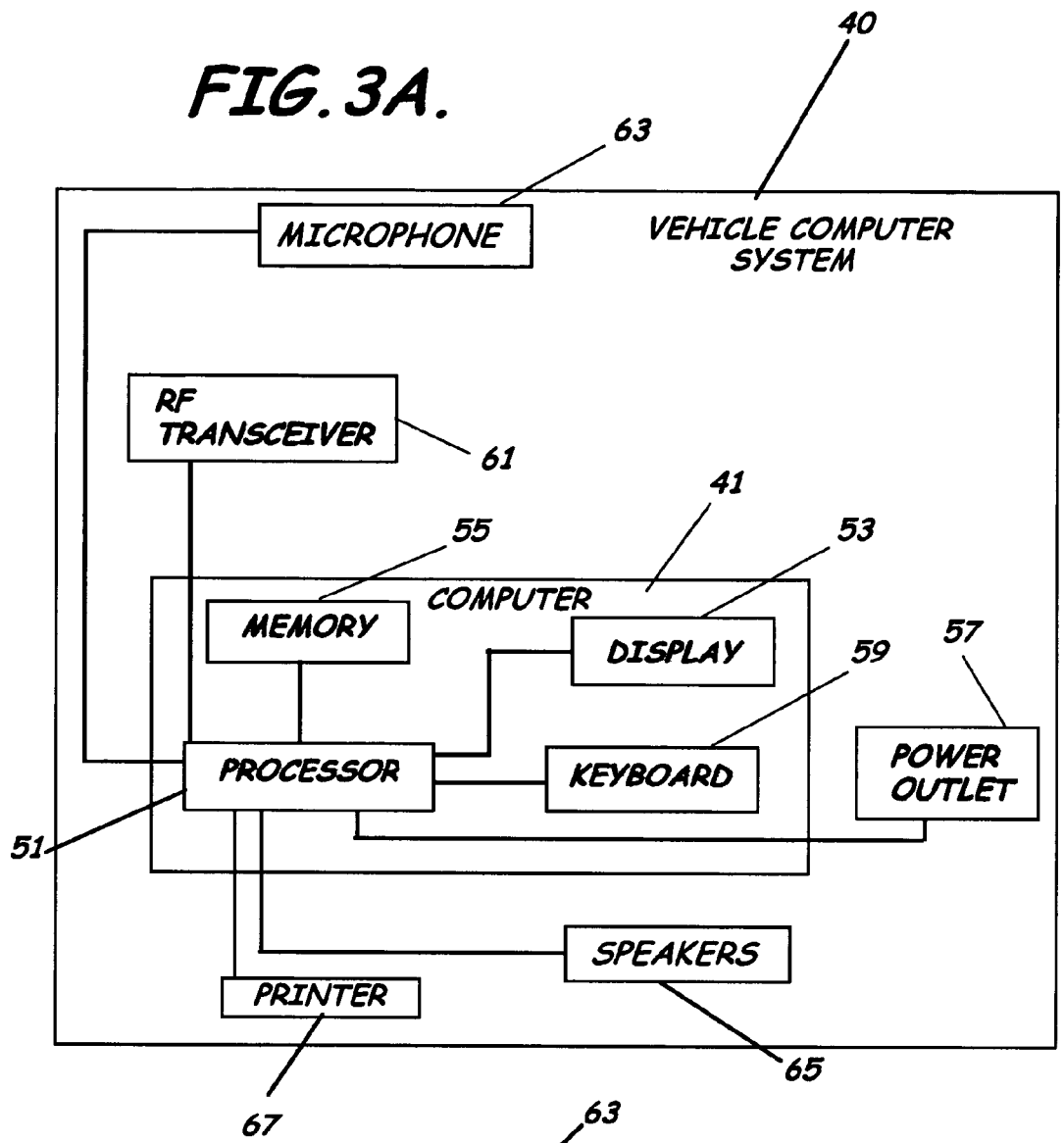
FIG. 3A is a schematic block diagram of a vehicle computer system of an apparatus to enhance command communication in a high-noise environment between a user and user vehicle mobile data computer system according to an embodiment of the present invention.
Figure 3B:
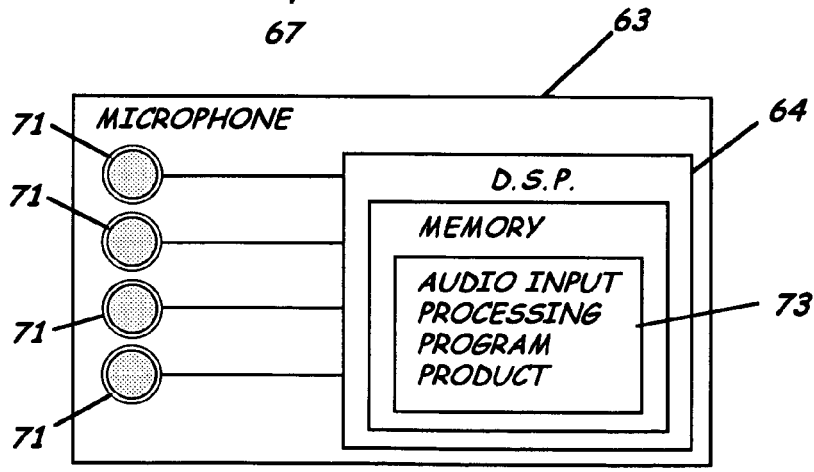
FIG. 3B is a schematic block diagram of a microphone to enhance command communication in a high-noise environment between a user and user vehicle mobile data computer system according to an embodiment of the present invention.

As perhaps best shown in FIGS. 1–4, generally, according to various embodiments of the present invention, the apparatus 30 (see FIG. 2) can include a centrally located department server 35 having access to one or more databases 38 to supply a vehicle user with data requested by the vehicle user; a vehicle mobile data computer system 40 (see FIGS. 1 and 3A) positioned in a vehicle V and having a mobile data computer application program 43 (FIG. 4) to provide wireless communication with the department server 35; a voice command interface program product 45 to provide voice recognition of voice (verbal) commands to thereby provide enhanced voice command control of the mobile data application program 43, particularly in a high-noise environment; and optionally a communication enhancing program product 47 to transmit enhanced audio data received from the mobile data application program 43 to the vehicle user through an audio speaker 65 (see FIGS. 1 and 3A).

More specifically, according to an embodiment of the present invention, the apparatus 30 can include a remote host computer e.g., a department a department server 35 in communication with one or more remote vehicle mobile data computers 41 each positioned in a vehicle V. The department server 35 preferably uses radio frequency to transmit and receive data to the vehicle mobile data computer 41. The department server 35 is also preferably in communication with at least one and preferably a plurality of remote computers, and possibly a local computer having data defining department databases 38, through a communications network 50 such as the Internet or a local area network. The department databases 38, for example, can include local, regional, or national law enforcement data such as the Department of Highway Safety and Motor Vehicles (DHSMV) database and the National Crime Data Center (NCIC) database, just to name a few. These databases can provide time critical information such as, for example, vehicle and individual background for law enforcement officers when positioned in vehicles as well as for law enforcement personnel in a headquarters or control center.

As perhaps best shown in FIG. 3A, the vehicle mobile data computer system 40 includes vehicle mobile data computer 41 preferably having a processor 51 to process communications and other type of data, a display 53 in communication with the processor 51 to display data to a user, memory 55, e.g., RAM and ROM, also in communication with the processor 51 for storing software and data therein, a power outlet 57 positioned to supply power to the processor 51 as well as other components of the vehicle mobile data computer 41, a keyboard 59 in communication with the processor 51 to supply a user interface to the user. The vehicle mobile data computer system 40 also preferably includes an RF transceiver 61 in communication with the processor 51 to transmit and receive data, and audio input device such as, for example, a microphone 63 (described in detail later) to provide voice command input to the vehicle mobile data computer 41, and at least one but preferably a plurality of speakers 65 for providing voice command acknowledgments and for delivering department data in audio form. The speakers 65 are preferably external speakers but can be speakers built into the computer or a preexisting speaker associated with a non-computer dispatching system as understood by those skilled in the art. As shown in FIGS. 1 and 3A, the vehicle mobile data computer system 40 also preferably includes one or more printers 67 or other computer peripherals in communication with the processor 51. When used in a law enforcement vehicle, for example, these printers 67 can be used for printing accident reports, tickets, warnings, towing citations, or filling in or populating other law enforcement forms.

Figure 4:
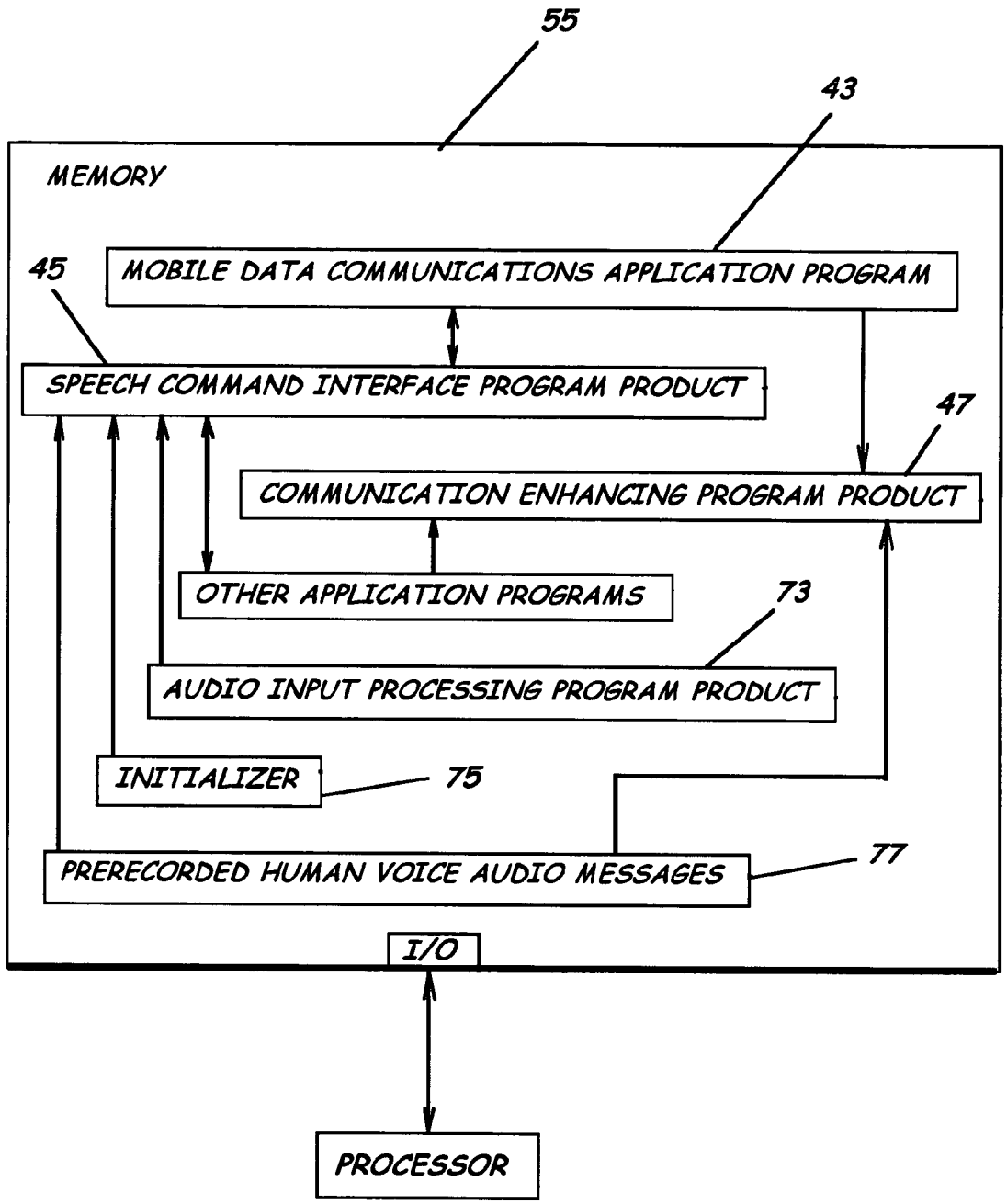
FIG. 4 is a schematic block diagram of memory of a vehicle computer of an apparatus to enhance command communication in a high-noise environment between a user and user vehicle mobile data computer system according to an embodiment of the present invention.

As perhaps best shown in FIG. 4, the vehicle mobile data computer 41 preferably includes operating system and computer application programs known to those skilled in the art, such as, for example, a mobile data communications application program 43, stored in memory 55 and provided to facilitate user communication with the department server 35 through the vehicle mobile data computer 41 and to transmit and receive department data from the one or more databases 38 through the department server 35 (see FIG. 2). The vehicle mobile data computer 41 can also include a communication enhancing program product 47 stored in memory 55 of the vehicle mobile data computer 41 and in communication with the mobile data computer application program 43 to enhance user communication with the department server 38 through the vehicle mobile data computer 41.

The communications enhancing program product 47 includes instructions to perform the operation of transmitting enhanced department audio data received from the mobile data computer application program 43 to the user through the audio speakers 65. Such enhanced department data includes preselected and prerecorded audio messages provided in response to the department data received by the mobile data computer application program 43 from the department server 35. One such apparatus or system providing such communications enhancing program product 47 is perhaps best described in co-pending U.S. patent application Ser. No. 10/656,487 by Rubenstein titled "Apparatus for Communicating with Law Enforcement During Vehicle Travel and Associated Methods," and U.S. Pat. No. 6,621,422 by Rubenstein titled "Apparatus for Communicating with Law Enforcement During Vehicle Travel and Associated Methods," each incorporated herein by reference in their entirety.

The vehicle mobile data computer 41 includes a voice command interface program product 45 stored in the memory 55 of the vehicle mobile data computer 41 and in communication with the mobile data computer application program 43 to enhance officer communication with the department server 38 through the vehicle mobile data computer 41. The voice command interface program product 45 can be in the form of microcode, programs, routines, and symbolic languages that provide a specific set for sets of ordered operations that control the functioning of the hardware and direct its operation, as known and understood by those skilled in the art.

The voice command interface program product 45 includes instructions to perform the operation of receiving as audio input a verbal command from the user representing a corresponding command input from the user through the microphone 63, and identifying the verbal command by analyzing the received audio input. According to a preferred methodology, an acoustic description of text corresponding to a specific set of voice commands stored in a vocabulary database (not shown) is compared against an acoustic signal generated by the utterance of the voice command to be recognized. The audio input received by the microphone 63 includes not only verbal or voice commands representing a corresponding command input defined as one or a series of keyboard key inputs, but also noise including continuous and repetitive noise and noise caused by reverberation of the voice commands from adjacent vehicle V structures.

The voice command interface program product 45 advantageously can distinguish between voice commands spoken by the user and noise. Proper selection of the microphone 63 can, however, significantly aid in performing such differentiation. There are numerous types of microphone transducers used for a variety of applications. The most common distinctions between various microphones are: type of microphone, e.g., dynamic, boundary, condenser, ribbon, array, and directional pattern, e.g., unidirectional and omni-directional. For example, in an embodiment of the present invention, the microphone 63 can be an Andrea DA-350 quad array microphone manufactured by Andrea Electronics Corp., Melville N.Y.

Although embodiments of the present invention are not limited to the DA-350 array microphone, advantageously, the DA-350 microphone, for example, is specifically designed for use in a vehicle. This array microphone provides not only directional focusing on and enhancing of the user's voice, but also overcomes high-noise environment factors associated with a moving vehicle. The DA-350 array microphone utilizes multiple microphones (transducers), unique software algorithms, and a digital signal processor to adaptively focus microphone sensitivity on the driver's voice, to thereby enhance voice reception and reduce extraneous noise. The DA-350 microphone, for example, can analyze audio signals coming from each individual microphone transducers in order to create a narrow reception cone having an angle of reception of approximately 25 degrees either side of centerline (preselected azimuth) and forming an area of reception. This reception cone is characterized by having a voice frequency response of between approximately −30 dBV and −45 dBV between a frequency range of 1 kHz to 3 kHz within the area of reception, and having an extremely steep drop in noise frequency response outside the area of reception to that of approximately −65 dBV to −85 dBV in that same frequency range.

The DA-350 microphone can differentiate between audio signals coming from its preselected azimuth, effectively rejecting noises or voices coming from other directions including those emanating from the audio speakers, other passengers, or due to reverberations. Further, the DA-350 microphone provides an ability to adjust focus to the movement of the speaker during dictation. The DA-350 microphone includes a digital signal processor which separates voice frequency from the noise, inverts the noise, and subtracts the noise from the voice signal, providing a reduction in noise sources of typically between 25 dB to 30 dB. Note, other microphones, such as, for example, the Andrea Superbeam® Array Microphone, also manufactured by Andrea Electronics Corp., provides a substitute having features similar to that described above.

Accordingly, in an embodiment of the present invention, the microphone 63 can be configured as an array microphone adapted to be connected to a vehicle V structure, e.g., dashboard or visor, positioned separate and spaced apart from the user to allow hands-free operation when receiving voice commands from the user (see FIG. 1). The microphone 63 include at least two, but preferably four unidirectional microphone transducers 71 with individual audio channels adapted to provide a directional area of audio input sensitivity having an adjustable angle and area of reception. This type of array microphone enhances detection of the verbal commands by allowing the user to manually focus the microphone reception zone on the user, significantly eliminating background noise from the various sources such as, road, engine, wind, fan, and radio. Further, according to this embodiment of the present invention, the microphone 63 does not require individual user training. Thus, advantageously, a different user can enter the vehicle V and be immediately ready to utilize the voice command interface program product 45. Nevertheless, the voice command interface program product 45 can include microphone training functionality preferably selectable through either a voice command or keystroke combination, e.g., ctrl-alt-m.

To further enhance distinguishing the verbal commands uttered by the user from other noise, provided can be an audio input processing (noise-canceling) program product 73 adapted to interface with the microphone 63. The audio input processing program product 73 includes instructions particularly adapted to enhance reception of the plurality of verbal commands to perform the operation of automatically adjusting or shaping the angle and area of reception of the audio input to the microphone 63, responsive to detection of audio input from the user, to focus the array on the user's voice, substantially reducing reverberation and other non-repetitive extraneous noise; and by attenuating continuous and repetitive noise, substantially removing or reducing voice command recognition latency. The audio input processing program product 73 can be installed in the memory of a digital signal processor 64 associated with the microphone 63 or in memory, e.g., memory 55, of the vehicle mobile data computer 41. The combination of a unidirectional array microphone 63 and audio input processing program product 73 can enable near optimal performance by overcoming the high-noise environment of a moving vehicle V, advantageously providing the voice command interface program product 45 a substantially clear voice command signal.

Advantageously, the combination can provide a significant differential in voice frequency response within the area of reception and background noise response outside the area of reception of, for example, approximately between 20 dBV and 35 dBV between the frequency range of 1 kHz to 3 kHz, and, for example, at least 25 dBV at the frequency of 1 kHz. Further, as a result the combination, the differential in voice frequency response within the area of reception and background noise response outside the area of reception is preferably at least 30 dBV at the frequency of 1 kHz, and more preferably at least 35 dBV at the frequency of 1 kHz.

According to an embodiment of the present invention, an initializer 75 is provided that can assign or provide assignment of a preferably very limited set of voice commands tailored to interface with various application programs for the vehicle mobile data computer system 40, e.g., mobile data computer application program 43. As perhaps best shown in FIGS. 5A, 5B, and 6, the initializer 75 can provide a set of unique voice commands (labels) 79, e.g., "license plate" or "plate," assigned to a correspondingly unique set of keyboard keystrokes or series of keystrokes 81, e.g., "Alt-c, F4, F5, F11," to select an application program page or frame 83, data entry field 85, or other graphical user interface input, and can assign the voice command interface program product 45 to use at least one of preferably the two most common spoken phonetic alphabets 87 (FIG. 5B), e.g., "alpha" to "zulu" or "adam" to "zebra," equating to a keystroke for corresponding letters of the alphabet (e.g., "A" to "Z").

According to various embodiments of the present invention, the voice command interface program product 45 is particularly adapted to be operated on a Windows® operating system configured with a speech application program interface (SAPI) engine. When so configured, the initializer 75 can be implemented by an initialization file, such as a ".ini" file, or data entered into the Windows® registry, or by various other means known to those skilled in the art. The initializer 75 is preferably fully editable by the user to provide the user an ability to tailor the various voice commands 79 to those typically familiar to the user and to add voice commands 79 to coincide with modifications or updates to the mobile data computer application program 43 or any other applications to be interfaced with the voice command interface program product 45. Further, through editing of the initializer 75, the user can change the selection between the at least two phonetic alphabets 87, as desired.

Advantageously, only a specific set of user-defined or specified voice commands assigned or defined by an initializer 75, and/or alphanumeric descriptions of individual keys associated with the keyboard 59, are compared for voice command recognition by the voice command interface program product 45. This is a significant feature that advantageously substantially improves voice command recognition accuracy and processing time, especially in a high-noise environment. Rather than comparing the received audio input to a large database of terms or phrases as is necessary with typical voice recognition programs, according to embodiment of the present invention, received audio input need only be compared to the specific commands necessary to operate the mobile data computer application program 43. Having such a limited vocabulary of voice commands and no dictation text to search advantageously reduces the probability that a noise signal will be interpreted as a voice command.

Figure 6:
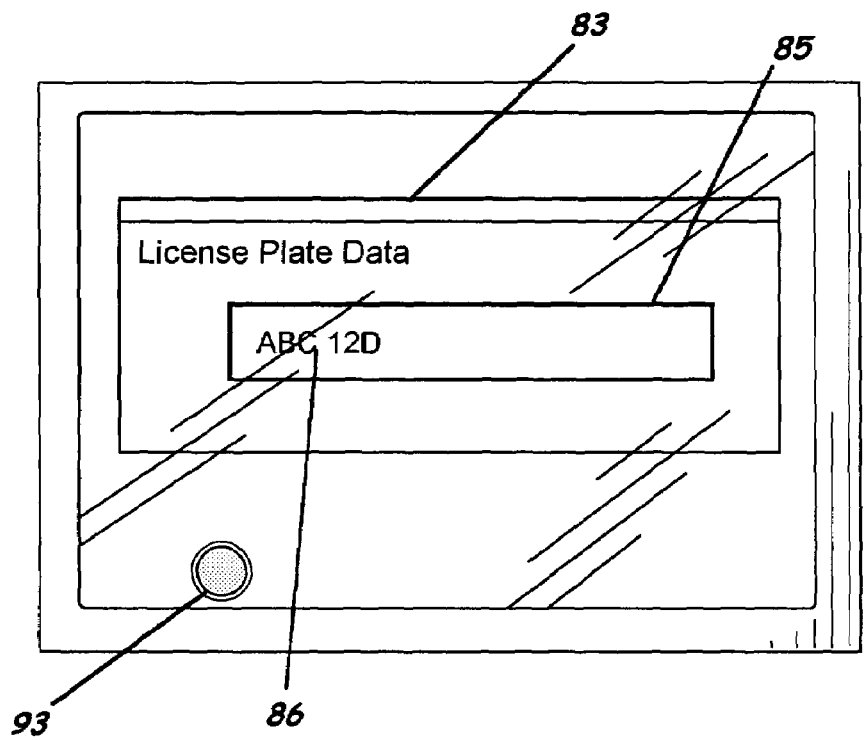
FIG. 6 is a front plan view of a form portion selection GUI according to an embodiment of the present invention.

For example, as perhaps best shown in FIG. 5A, 5B, and 6, the voice command interface program product 45 can be implemented to only recognize voice commands listed as unique voice command (labels 79), e.g., "plate," assigned to the correspondingly unique keyboard keystroke or series of keystrokes 81 (e.g., "Alt-c, F4, F5, F11") to select an application program page or frame 83 to enter a license "plate" number 86; one of two spoken phonetic alphabets 87 as pre-selected in the initializer 75 (e.g., "alpha" to "zulu" or "adam" to "zebra") equating to a keystroke for corresponding letters of the alphabet (e.g., "A" to "Z") to select alphabetical letters of the license "plate" number 86; and the spoken numbers "zero" to "nine" equating to a keystroke for the corresponding Arabic numerals (e.g., numerals "0" to "9") to select numerals of the license "plate" number 86. Note, alternative languages or numbering schemes are within the scope of the present invention.

After the voice command is identified by the voice command interface program product 45, the voice command interface program product 45 can provide an "echo" of the identified voice command through the audio speaker 65, and preferably upon the user acknowledging that the voice command was correctly interpreted by the voice command interface program product 45, in response to hearing the echo, transmitting the command input to the mobile data computer application program 43. The echo, preferably in the form of audio data, such as, for example, an audio file or combination of files 89 (e.g., .wav file) assigned to a voice command by the initializer 75 is outputted or otherwise transmitted or "played" on the audio speaker 65. The echo can include a preselected and prerecorded audio message verbally repeating the identified verbal command to include individual letters from the phonetic alphabets 87 and numbers, described previously. Particularly, at least portions of the audio data associated with the identified verbal command or command string can include an audio message representation of the identified command in prerecorded human (clear) voice.

According to embodiments of the present invention, the voice command interface program product 45 can include a plurality of preselected and prerecorded human voice audio messages 77 preferably stored in memory 55 and assigned during initialization to various preselected voice commands. According to another embodiment of the present invention, the echo for the various voice commands can be enabled or disabled either as a group or individually for selected individual voice commands, either within the initializer 75 or through use of a control selector key on keyboard 59. Further, audio data (e.g., the human voice audio message 77) assigned to individual voice commands can be modified or deleted and/or new or additional audio messages can be added to a particular voice command (label 79). This can be accomplished preferably through a user editing the initializer 75.

Figure 7:
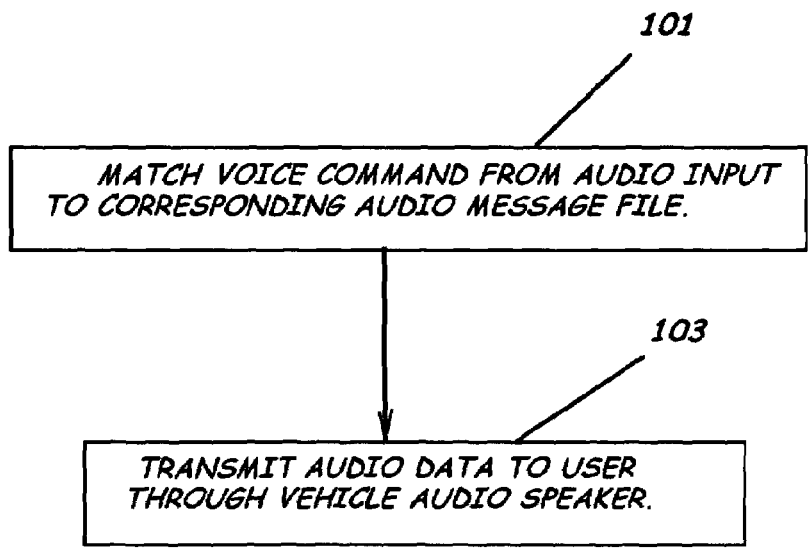
FIG. 7 is a schematic flow diagram showing transmission of audio data representing an echo of an identified voice command according to an embodiment of the present invention.

As shown in FIG. 7, the voice command interface program product 45 preferably formulates the echo message to be transmitted by matching (block 101) the identified voice command (label 79) with the corresponding preselected and pre-recorded audio message 77 (see FIG. 5A), rapidly returning or transmitting (block 103) an echo message to the user through the speakers 65 (see FIG. 1) to provide the user positive feedback. Although providing a text-to-voice echo message for the entire voice command is within the scope of various embodiments of the present invention, the human voice audio messages 77 for at least the main portion of the voice command are preferred because human voice audio messages 77 can be much more intelligible and can be preselected to be male, female, soothing, urgent sounding or have other desired qualities in addition to selected languages, accents, intonations or other voice language benefits instead of what is often robotic, stiff or stilted sounding from conventional text-to-voice messages.

As described previously, noise can affect the ability of the voice command interface program product 45 to identify the predetermined or preselected voice commands. More particularly, some noise signals can have similar qualities as that of one or more voice commands. The result of such noise signals can be inefficient use of processor 51 resources in an attempt to identify the noise signals as a voice command. This can result in a significant distraction to a vehicle user because the user must generally either determine that the processor 51 is not busy prior to providing a voice command or provide such voice command, anticipating that the voice command will be properly received. Thus, according to the preferred embodiment of the present invention, an icon 93 (FIG. 6) is provided on the graphical user interface of the video display 53 to show the status of the processor 51 with respect to receptiveness of receiving a voice command. For example, the icon 93 can display various colors indicating system status, e.g., green to indicate ready to receive voice commands, yellow to indicate busy, and red to indicate an error has occurred, or can display any other combination of colors or symbols thereof.

Where the voice command requires a call, such as, for example, "plate," to go to a license plate entry page 83, followed by a set of letters and numbers identifying the license plate number 86, e.g., "ABC 12D," to be entered in a text field 85, the user may be confused as to which part of the voice command needs to be provided. Thus, according to another methodology of enhancing command communication, especially in a high-noise environment, the voice command interface program product 45 can include instructions that are responsive to a preselected or predetermined time delay or time-out, e.g., less than approximately three seconds, to perform the operation of rejecting the received audio input as being a voice command from the user; and resetting to receive another voice command from the user. Advantageously, this functionality reduces the effect of noise by preventing inefficient use of the processor 51 resources in an attempt to identify the noise as a voice command, and enhances functionality of the voice command interface program product 45 by reducing confusion and distraction of the user, thus increasing reliability. If the audio input is merely noise, excessive use of resources of the processor 51 should be negated. If the audio input was a mix of noise and a voice command, if no echo is received after expiration of the preselected or predetermined time delay, intuitively the user will know that the voice command was not received or otherwise not identified, so that the user may repeat the voice command with little delay.

According to embodiments of the present invention, the voice command interface program product 45 includes instructions that respond to user manipulation of a preselected control function selector, e.g., a keyboard key or an external input device (not shown), to perform the operation of enabling receiving audio input from the microphone 63 to transmit or otherwise provide to the mobile data computer application program 43 the command inputs received and identified as voice commands (audio input) by the voice command interface program product 45. For example, the leftmost control key 91 of the keyboard 59 can be assigned to perform the function of a push-to-talk control selector. The user depresses the control key 91, enabling the microphone 63, and provides a voice command, which is received by the microphone 63. Upon either initial release of the control key 91 or again pressing and releasing the control key 91, the microphone 63 is disabled, disabling further audio input from the microphone 63. Note, according to the preferred embodiment of the present invention, the selection of which control selector provides the push-to-talk function and the functionality of the control, performed by the selected control selector, are both fully editable by the user through editing the initializer 75.

According to an alternative embodiment of the present invention, similar to that described above, a control selector, such as the leftmost control key 91 of the keyboard 59, can be assigned to perform the function of a push-to-talk control selector, whereby the user depresses the control key 91 to enable the microphone 63. Rather than disabling audio input from the microphone 63 by releasing or again pressing and releasing the control key 91, this function can be performed automatically in response to a preselected or a predetermined time delay or a time-out.

In response to identification of the voice command, the voice command interface program product 45 provides an echo of the voice command through the audio speakers 65. The control input associated with the voice command can then be conveyed to the mobile data computer application program 43, preferably after: receiving a confirmation voice command from the user, such as, for example, "send"; receiving a correction command, such as, for example, "clear" or "backspace"; or standing by and awaiting additional user input. For example, a user gives the voice command "license plate" or "plate." After the voice command interface program product 45 provides an echo of the voice command back to the user and sends the corresponding command input to the mobile data computer application program 43, the mobile data computer application program 43 will be awaiting entry of a license plate number 86, e.g., "ABC 12D."

After the user verbally provides the license plate number 86, e.g., "ABC 12D," which can also be echoed, the mobile data computer application program 43 will be awaiting the command input corresponding to the "send" voice command. Advantageously, according to an embodiment of the present invention, a series of command inputs can be concatenated by concatenating corresponding voice-commands. For example, the user can state the combined voice commands of "plate"-"ABC 12D"-"send." The voice command interface program product 45 can then provide an echo of either parts of the combined voice command or the whole combined voice command e.g., "plate"-"ABC 12D"-"send." The vehicle mobile data computer 41, upon receiving the requested license plate number, through the communication enhancing program product 47, can announce receipt of the requested information and await authorization to output such information through the speakers 65 (FIG. 1), automatically output such information upon receipt, or perform a combination thereof.

In order to aid the user in determining that the preselected control selector (e.g., left control key 91) was properly depressed, an indication preferably in the form of audio data, such as, for example, an audio file (e.g., .wav file) can be assigned to the control selector to be outputted or otherwise transmitted or "played" on the audio speaker 65 upon activation of the respective control selector. Correspondingly, a preferably moderately distinct set of audio data, also preferably in the form of an audio file, can be assigned to the control selector to indicate release or deactivation of section selector. Advantageously, providing such audible indications helps reduce the potential for a vehicle accident by negating any need for the user to look at the control selector to determine if it was properly manipulated. Note, according to an embodiment of the present invention, the functionality of providing an audible indication of activation of the preselected control selector (e.g., left control key 91) can be, itself, controlled either by a separate control selector or a sequence of manipulations of the preselected control selector. This functionality can be assigned within the initializer 75 and edited by the user.

As an alternative to having to manipulate a control selector (e.g., control key 91) for each instance the user wishes to convey a voice command, the voice command interface program product 45 can include instructions to perform the operation of monitoring the audio input for a specific command assigned to perform the function of enabling receiving of other voice commands. For example, the word "Christine" or other selected unique name for the "computer" can be assigned by the initializer 75 to perform the push-to-talk function. Thus, in order to "turn on" the functionality of the voice command interface program product 45, the user states "Christine" which can be identified and echoed through the area speaker 65. The user can then convey the other of the plurality of voice commands, e.g., "plate," "cancel," "clear," "send." In this configuration, prior to stating the voice command "Christine," all other commands would be otherwise ignored even if received. Advantageously, this functionality allows entirely hands-free manipulation of the mobile data computer application program 43 while preventing inadvertent reception or misinterpretation of noise or voice commands embedded in conversational speech not directed to the mobile data computer application program 43, such as speech with a passenger or radio dispatcher.

Correspondingly, the phrase "Christine standby" or other unique word or phrase can be assigned command disable the functionality of the voice command interface program product 45, preferably with the exception of receipt and processing of the preselected "on" voice command, e.g., preferably another "Christine." Alternatively, the voice command interface program product 45 can include instructions, responsive to a preselected time delay, such as, for example, 10 seconds of not receiving a voice command, to perform the operation of disabling the functionality of the voice command interface program product 45. Again this disabling function is preferably implemented with the exception of allowing receipt and processing of the preselected "on" voice command, e.g., "Christine."

Figure 8:
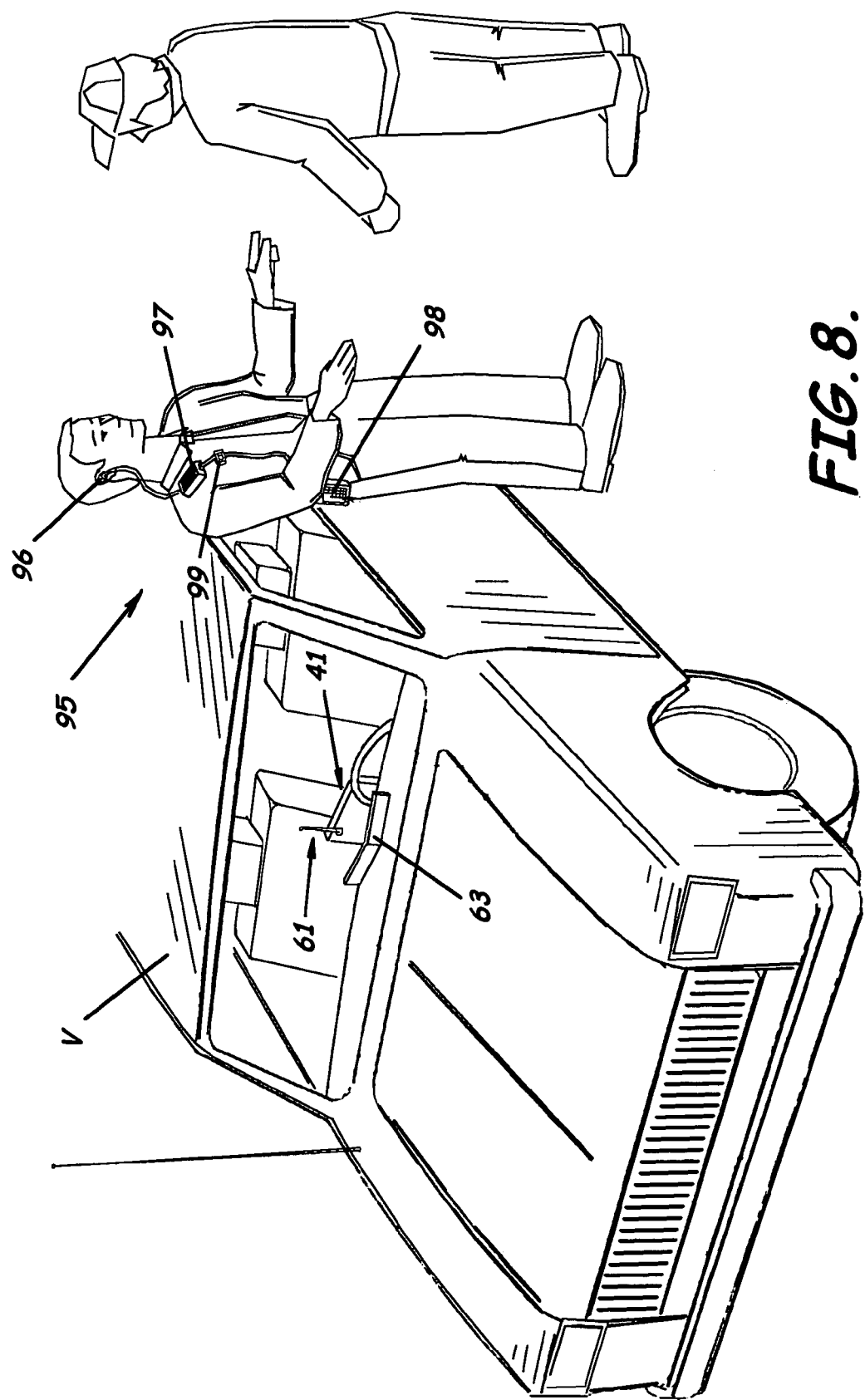
FIG. 8 is an environmental perspective view of a user in communication with the vehicle mobile data computer system illustrated in FIG. 1 according to an embodiment of the present invention.
Figure 9:
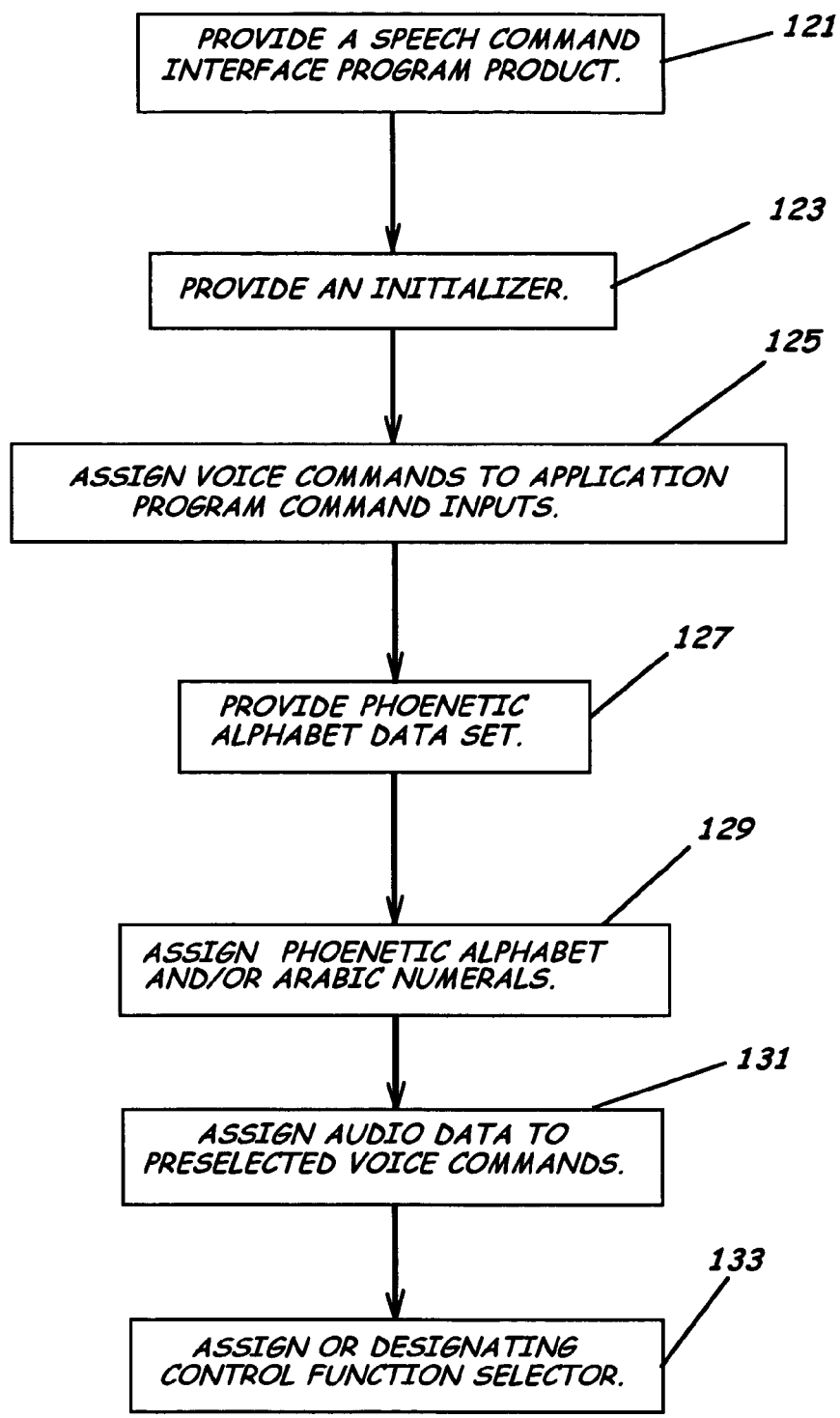
FIG. 9 is a schematic flow diagram of a method of enhancing command communication in a high-noise environment between a user and a mobile data computer system according to an embodiment of the present invention.

As perhaps best shown in FIG. 8, the apparatus 30 can also include a wireless microphone assembly 95 including a microphone 97 and audio speaker 98 adapted to provide wireless audio communication between the vehicle mobile data computer 41 and the user when outside the department vehicle V to transmit the voice commands from the user to the mobile data computer application program 43 (see FIG. 4) through the voice command interface program product 45, to thereby provide command input to the mobile data computer application program 43. Also provided is the ability to receive an audio echo for each of the voice commands, to thereby provide the user verification of correct identification of each respective voice command by the voice command interface program product 45. In the preferred configuration, the wireless microphone assembly 95 transmits data to, and receives data from, the vehicle transceiver 61. Further, the voice command interface program product 45 is preferably selected to be either continuously on, in which case, mute switch 99 can control audio input to the microphone 97, or can be voice activated using a preselected "on" voice command.

As shown in FIGS. 1–12, embodiments of the present invention provide a method of enhancing command communication in a high-noise environment between a user and a user vehicle mobile data computer. For example, as perhaps best shown in FIG. 9, according to an embodiment of the present invention, a method includes providing a voice command interface program product 45 (block 121) particularly adapted to interface with a vehicle mobile data computer 41 (see FIGS. 1 and 3A) running a vehicle mobile data computer application program 43 (see FIG. 4) requiring command input by providing vehicle mobile data computer input device emulation.

The method also includes providing an initializer 75 (block 123) accessible by the voice command interface program product 45 and configured to assign each of a plurality of preferably customer or user specific/specified voice command terms or phrases, e.g., labels 79 (see FIG. 5A), defining a plurality of vehicle mobile data computer application program voice commands, to a corresponding plurality of vehicle mobile data computer input device command inputs, e.g., keystrokes 81, for the vehicle mobile data computer application program 43 (block 125). The initializer 75 can be in the form of a text file or a program which can assign the preselected set of voice commands to a corresponding set of keyboard keystrokes or series of keystrokes or other command inputs to thereby select an application program page or frame 83 (see FIG. 6), data entry fields 85, or other graphical user interface input.

The method also includes providing a plurality of phonetic alphabet data sets (see e.g., FIG. 5B) to provide command input of a plurality of letters corresponding to a plurality of vehicle mobile data computer input device inputs for the vehicle mobile data computer application program 43 (block 127). Correspondingly, the initializer 75 can assign (block 129) the voice command interface program product 45 to use at least one of preferably the two most common spoken phonetic alphabets 87 (e.g., "alpha" to "zulu" or "adam" to "zebra") equating to a keystroke for corresponding letters of the alphabet (e.g., "A" to "Z"). The numbers "zero" to "nine," equating to a keystroke for corresponding numerals "0" to "9," can also be assigned accordingly, if not already done so in an operating system SAPI.

The method also includes assigning an audio message (block 131) in the form of an echo to at least some of the assigned voice commands, and/or assigned letters and numbers, to acknowledge the voice command received from the user (see FIG. 5A). The audio message is preferably in the form of a prerecorded human voice message 77 (see FIG. 4) that is preferably activated by manipulation of a control function selector, e.g., left control key 91 (described further below), or by a time delay instituted after identifying the voice command. For example, as perhaps best illustrated in FIGS. 1, 5, and 6, with respect to a typical law-enforcement vehicle mobile data computer application program 43, the user depresses the left control key 91 and provides the voice command "plate." Upon release of the key, a preselected time delay, or a combination thereof, the voice command interface program product 45 will activate a corresponding keystroke combination to access a corresponding application program screen or text entry field. In this example, as illustrated in FIG. 5A, the keystroke combination "Alt-c, F4, F5, F11" would be performed. As illustrated in FIG. 6, the user would then provide a voice command such as "Alpha"-"Bravo"-"Charlie"-"one"-"two"-"Delta" corresponding to license plate number "ABC12D." The voice command interface program product 45 would then cause activation of the keystrokes "a"-"b"-"c"-"1"-"2"-"d," and, if selected to do so, provide a corresponding echo of the license plate number. The license plate data can be either automatically transmitted to the department server 35 (see FIG. 2) or the user would then provide another voice command, such as "send," to do so if the echo properly repeated the license plate number "ABC12D," or "clear" or "backspace," if the interpretation was incorrect. Note, each voice command or a preselected subset of the voice commands could be echoed, if selected to do so. Further, the echo need not be an actual repeat of the actual voice command. For example, the voice command "send" can be returned as "sending."

As stated above, the method can also include assigning or designating a control function selector (block 133), e.g., the left control key 91 of the keyboard 59 (see FIG. 1), or other input device of the vehicle mobile data computer 41, as a voice command interface program product on-off operation control selector defining a push-to-talk switch. An audible indication, preferably in the form of an audio file to indicate activation and/or deactivation of the control selector, can also be assigned in order to aid the user in determining that the preselected control selector (e.g., left control key 91) was properly manipulated. The audio data or audio file assigned can be different depending upon the function performed, e.g., selection "on" or selection "off," or can be the same file to indicate both selection and deselection.

The method can further include editing the initializer 75 (see FIG. 5A) by a user to assign an additional command term or phrase to a corresponding keyboard key or other vehicle mobile data computer input device input specifically tailored to the vehicle mobile data computer application program 43; or to change the command input, e.g., keystrokes 81, for a pre-existing voice command term or phrase, in response to a modification of the vehicle mobile data computer application program 43. A pre-assigned voice command can also be edited to change the identification or name of the voice command (label 79); to delete the voice command (label 79), in response to a desired grammatical change by the user; or to change the audio data, e.g., audio file 89, associated with the voice command, in order to suit user preferences.

Figure 10:
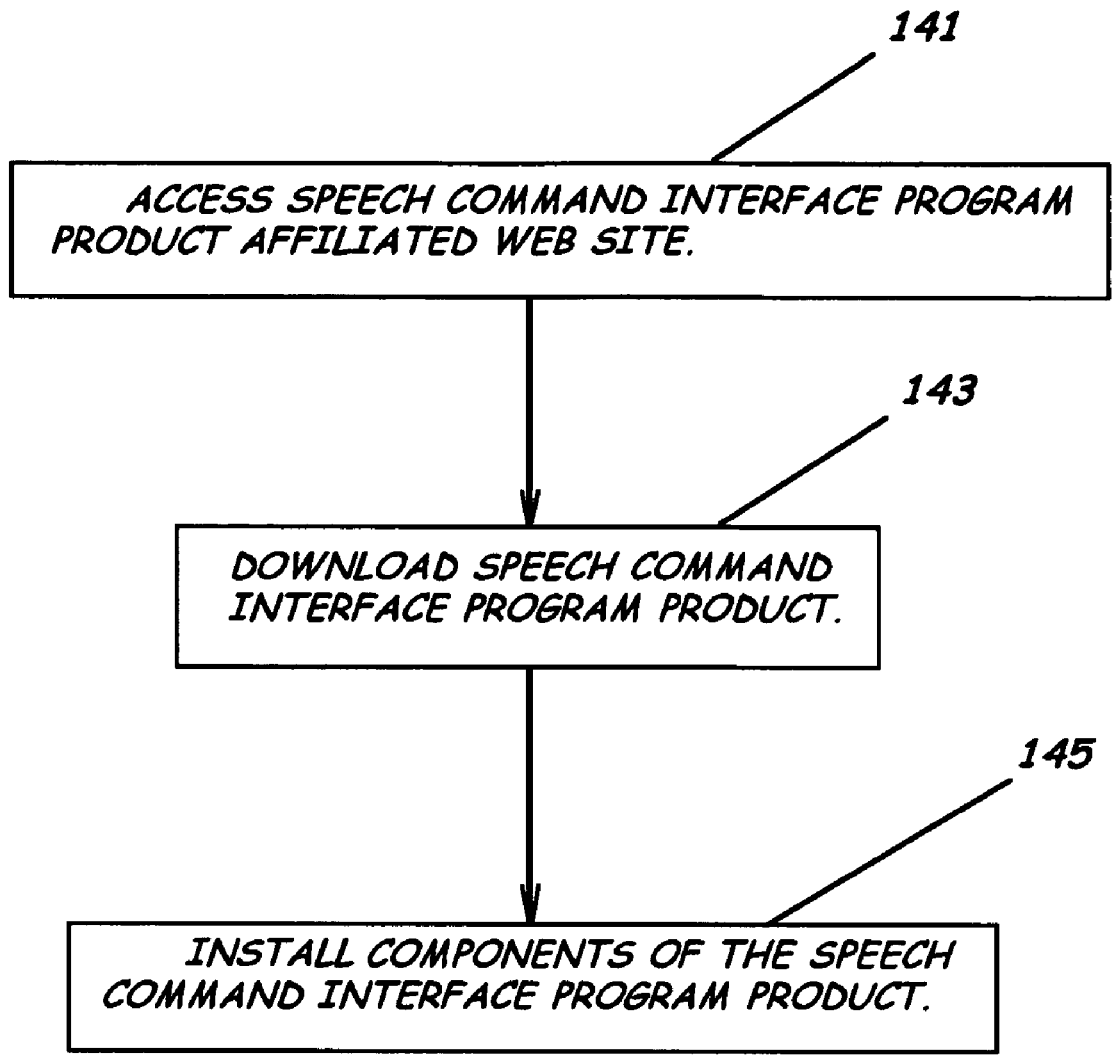
FIG. 10 is a schematic flow diagram of a method of enhancing command communication in a high-noise environment between a user and a mobile data computer system according to an embodiment of the present invention.

As perhaps best shown in FIG. 10, a preferred methodology of performing the steps of providing a voice command interface program product 45 and providing initializer 75 includes accessing (block 141), preferably through a communications or area network 50 (see FIG. 2), a user accessible web site preferably positioned on a Web server (not shown), to "download" or otherwise receive (block 143) a voice command interface program product 45 (see FIG. 4) that is adapted to provide vehicle mobile data computer input device emulation for a vehicle mobile data computer application program 43 installed on a vehicle mobile data computer 41 (see FIG. 1). The voice command interface program product 45 can be provided and received by a user, preferably directly through the vehicle mobile data computer 41, in the form of a single self-extracting executable program that includes the voice command interface program product 45. The self-extracting executable program preferably installs an initializer 75 (see FIG. 5A) which is adapted to assign a plurality of preferably user-specified voice commands to a correspondingly unique set of keyboard key command inputs, i.e. keystrokes or series of keystrokes 81. The method includes executing or running the self-extracting executable program, to thereby install each of plurality of components (block 145) of the voice command interface program product 45 and the initializer 75 in memory 55 of the vehicle mobile data computer 41.

Figure 11:
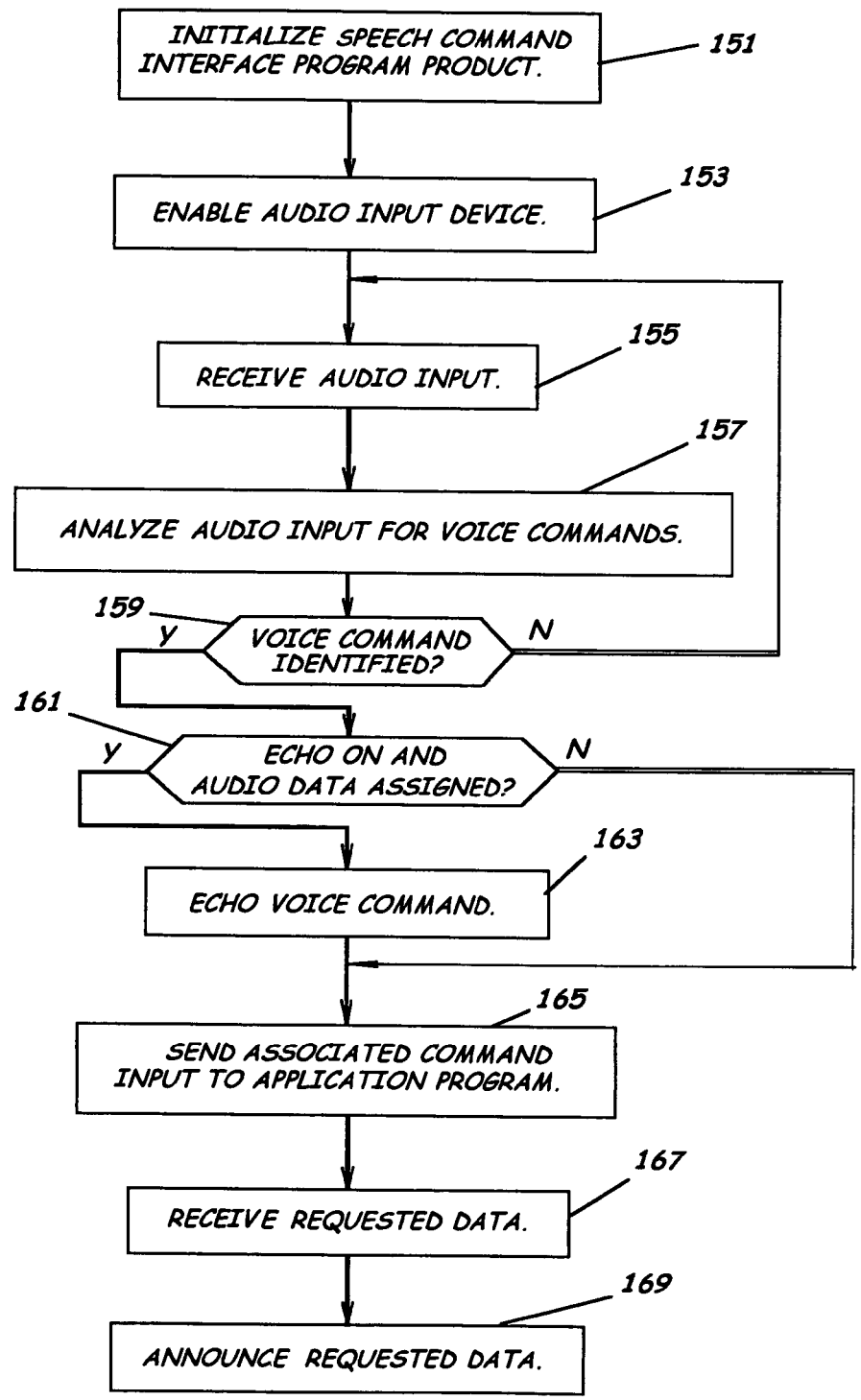
FIG. 11 is schematic flow diagram of a method of enhancing command communication in a high-noise environment between a user and a mobile data computer system according to an embodiment of the present invention.

As perhaps best shown in FIG. 11, provided is a method of enhancing command communication in a high-noise environment between a user and a user vehicle mobile data computer 41. Preferably upon startup/initialization (block 151) of a voice command interface program product 45 (see FIG. 4), each of a plurality of user-tailored voice commands, to be received as audio input from a microphone 63, 97 (see FIGS. 1 and 8), and a phonetic alphabet (see FIG. 5B), are assigned to a corresponding keyboard key command input, e.g., keystrokes 81, to interface the voice commands with a vehicle mobile data computer application program 43, to thereby provide command input to the vehicle mobile data computer application program 43. The numbers "zero" to "nine," equating to a keystroke for corresponding numerals "0" to "9," can also be assigned accordingly if not already done so in an operating system SAPI.

The initialization can also include assigning, to at least some of the assigned voice commands and/or assigned letters and numbers, an audio data message in the form of an echo to acknowledge the voice command received from the user. The echo is preferably in the form of a prerecorded human voice audio message 77. The initialization can further include designating a control function selector, e.g., the left control key 91 of the keyboard 59 (see FIG. 1), or other input device of the vehicle mobile data computer 41, as a voice command interface program product on-off operation control selector defining a push-to-talk switch. Note, the push-to-talk switch (control selector) can also be assigned audio data to indicate a change in state of the assigned control selector (see FIG. 5B).

The method can also include enabling an audio input device (block 153), e.g., the microphone 63, 97 (see FIGS. 1 and 8), to allow the voice command interface program product 45 to provide a verbal interface with the vehicle computer application program 43. With respect to the vehicle mounted microphone 63, this is typically accomplished by depressing or otherwise manipulating the left control key 91, if so assigned such function, but may include un-muting the microphone 63, if so configured. In one configuration, the left control key 91 is depressed and held to allow the user to provide voice commands. In another configuration, the left control key 91 need only be depressed momentarily and released, the microphone 63/audio input being enabled for a predetermined or preselected time delay, and disabled thereafter, or disabled after a predetermined or preselected time period without receiving a voice command from the user. In still another configuration, the audio input remains enabled continuously. With respect to the wireless microphone assembly 95, enabling the microphone 97 is typically accomplished by a combination of use of a power button (not shown) and mute switch 99.

Regardless of the configuration, the method includes receiving voice commands and/or noise as audio input from the user through the microphone 63, 97 (block 155), and performing an acoustic description comparison or other analysis known to those skilled in the art on or for the received audio input (block 157). If the audio input is determined to include one or more voice commands assigned during initialization, a signal is transmitted to execute an associated one or more vehicle computer application program command inputs. The analysis is preferably only performed for a maximum of a predetermined or preselected time delay or timeout. Advantageously, this functionality allows quick recognition of the voice command not accompanied by excessive noise, and provides an ability to suppress a noise signal that would otherwise excessively use processor resources and/or excessively delay a user's ability to convey a voice command, potentially distracting the user. This functionality provides a time limitation to allow the voice command to be repeated, if necessary, substantially without delay, when a very low voice signal-to-noise ratio is encountered; rather than cause a distraction to the user while the user waits for the processor 51 to try, and likely fail, to identify the voice command from amongst the noise signal. A system tray icon 93 can be displayed to further indicate that audio input is being processed to further orient the user as to the availability of providing additional voice commands.

If a voice command is identified (block 159) and if the echo function is enabled and audio data is assigned to the respective voice command (block 161), preferably upon release of the left control key 91 or after a predetermined or preselected time delay, the voice command is echoed (block 163) through the audio speakers 65 (see FIG. 1) and the command input, e.g., keyboard emulation, is sent (block 165) to the vehicle computer application program 43 (see FIG. 4). The vehicle application program 43 can then either access vehicle memory 55 or access a department server 35 (see FIG. 2) to receive requested data (block 167). Audio data, indicating a change in state of the left control key 91 (see FIG. 1), can be sent to the audio speakers 65, if such functionality was assigned. Also, according to an embodiment of the present invention, the user may manipulate other control keys, which can be assigned to control whether the audio data associated with the control key 91 and/or the audio messages 77 associated with the various voice commands, are enabled. Further, according to an alternative embodiment of the present invention, the enabling or disabling of audio messages 77 can be provided individually for each voice command in a subset of the plurality of assigned voice commands. Still further, a communication enhancing program product 47 can extract the requested data, summarize the data, and verbally announce to the user the requested data (block 169).

In an embodiment of the present invention, as described previously, rather than having to depress and hold the left control key 91 or other selected control selector, in order to provide voice commands, the user need only depress the left control key 91 once to enable system functionality, after which the user may provide voice commands, as desired, to further control access to such system functionality. This can be an important feature, especially when implemented in conjunction with a mobile or wireless microphone assembly 95 (see FIG. 8). Correspondingly, in this embodiment of the present invention, the method includes: transmitting the voice commands to a vehicle computer application program 43 from outside the vehicle V through the microphone 97; providing command input to the vehicle computer application program 43 through a voice command interface program product 45; and receiving an audio echo of the voice commands through either an audio speaker 96, 98, also carried by the user, to thereby provide the user verification of correct receipt of each voice command, and thus, correct command input.

As perhaps best shown in FIG. 8, the microphone assembly 95 is adapted to be carried by the user positioned outside a user vehicle V, to thereby provide the user a substantially hands-free ability to transmit voice commands to a receiver, such as, for example, either transceiver 61 (see FIG. 1) or an alternative transceiver (not shown) directly connected to the vehicle V and in communication with the vehicle mobile data computer 41. Note, the microphone assembly 95 need not remain continuously on, unless desired by the user. As described previously, to control or limit audio input to the vehicle mobile data computer 41, the microphone assembly 95 can include a mute button 99 and/or the voice command interface program product 45 can include functionality to allow specific commands to either activate or render dormant the voice command interface program product 45.

Figure 12:
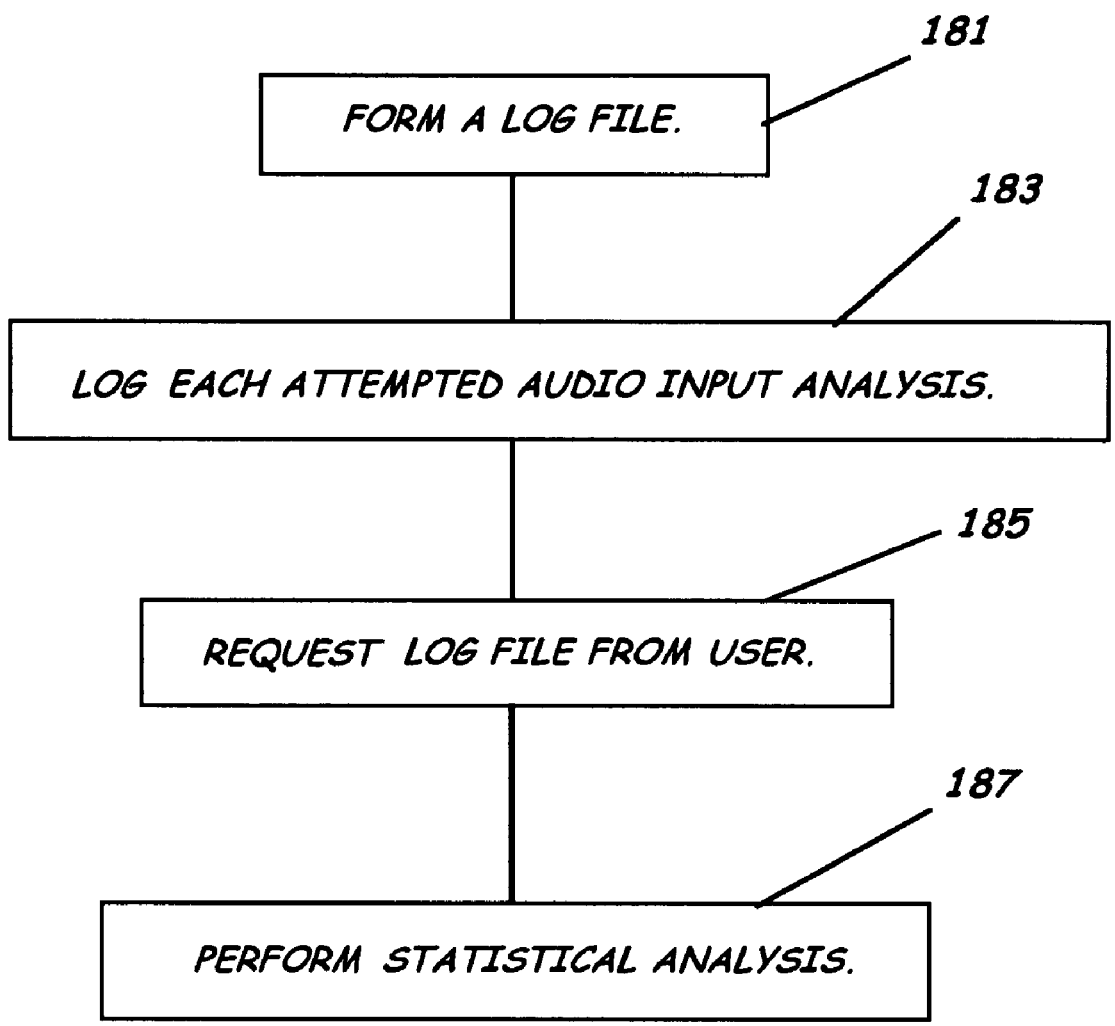
FIG. 12 is a schematic flow diagram of a method of enhancing command communication in a high-noise environment between a user and a mobile data computer system according to an embodiment of the present invention.

As shown in FIG. 12, advantageously, an embodiment of the present invention also includes a method of enhancing command communication in a high-noise environment between a user and a user vehicle mobile data computer system which includes forming a log file to log each attempt at recognizing an audio input (block 181); and logging in the log file each attempt in response to receiving such respective audio input (block 183). Each entry into the log file can include data indicating the date, time (including seconds), and results of the audio input analysis. The method can also include requesting the log file from the user (block 185); and performing a statistical analysis on the log file to analyze recognition failure rates (block 187). Advantageously, such data allows for continuous enhancement and development of improved process steps and the voice command interface program product 45.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links, including those described previously.

As shown in FIGS. 1–12, embodiments of the present invention also include a computer readable medium that is readable by a computer to enhance command communication in a high-noise environment between a user and a vehicle mobile data computer application program. For example, in an embodiment of the present invention, the computer readable medium includes a set of instructions that, when executed by the computer, such as, for example, vehicle mobile data computer 41 (see FIG. 1), cause the computer to perform the operation of extracting data from an initializer 75 (see FIG. 5A) configured to assign each of a plurality of user-specific or user-specified voice command terms or phrases, defining a plurality of vehicle mobile data computer application program voice commands, to a corresponding vehicle mobile data computer input device command input, e.g., keyboard keystroke or series of keystrokes, for the vehicle mobile data computer application program 43. The initializer 75 can be implemented by an initialization file such as, for example, an ".ini" file, through data entered into the Windows® registry, or by various other means known to the skilled in the art. The instructions also include those to perform the operation of assigning the voice commands to corresponding vehicle mobile data keyboard key command inputs to thereby interface with the vehicle mobile data computer application program 43.

In response to the initialization, the instructions can further include those to perform, when in a high noise environment, the operations of receiving, through an audio input device, e.g., microphone 63, 97, audio input including both voice commands from the user and noise from the vehicle V. Also included are instructions to perform the operation of performing an acoustic description comparison on the received audio input to thereby identify: voice commands assigned in or by the initializer 75; members of a phonetic alphabet associated to or with the initializer 75 to provide command input corresponding to a plurality of letters each corresponding to separate keyboard key input for keyboard 59; and a plurality of numbers each corresponding to a separate numerical keyboard key input for keyboard 59. Particularly with respect to law-enforcement, voice command recognition speed and accuracy is essential in order to prevent unwarranted distraction of an officer. Accordingly, by providing a very limited set of voice commands which are easy to assign and remember, the officer, even in a very high-stress situation, can easily convey, and the voice command interface program product can quickly recognize, all voice commands necessary to operate the mobile data communications application program or other application programs. Further, selection of the very limited set of voice commands: reduces the amount of system resources and time required to analyze the audio input; and increases the probability of accurately recognizing each particular voice command.

The result of the acoustic description comparison is to identify one or more voice commands presented by the user to thereby execute an associated vehicle mobile data computer application program command input. For example, as perhaps best shown in FIG. 6, rather than type a license plate number, the user annunciates corresponding letters of the assigned phonetic alphabet and the Arabic numerals corresponding to those letter and number keys on keyboard 59. This license plate number is then sent, and data is returned by the mobile data communications application program 45.

In an embodiment of the present invention, a computer readable medium that is readable by a computer, e.g., vehicle mobile data computer 41, includes a set of instructions that, when executed by the vehicle mobile data computer 41, cause the computer to perform the operations of: receiving as audio input from the user through the microphone 63, 97, a voice command representing a vehicle mobile data computer application program command input; and identifying the voice command by analyzing the received audio input. The instructions also include those to perform the operations of: echoing the identified voice command through an audio speaker 65, in response to identification of the received voice command and/or release of a push-to-talk control key; and transmitting the corresponding command input to the vehicle mobile data computer application program 43. The echo preferably includes preselected audio data associated with the identified voice command including a representation of the identified voice command, preferably in the form of a prerecorded human voice audio message 77, verbalizing a representation the identified voice command.

The audio input is preferably enabled and the echo is preferably initiated either through manipulation of a control key, such as, for example, left control key 91. Other alternatives within the scope of the present invention include enabling audio input for a plurality of the voice commands through use of a unique enabling voice command, such as, for example, "computer," "vehicle computer," or "Christine." In this embodiment of the present invention, audio input is disabled either through use of the left control key 91, a preselected or predetermine time delay without receiving a voice command, and/or a disabling voice command such as, for example, "computer off." Various combinations of this embodiment include, for example, enabling the receiving of audio input and/or transmission of command input associated with identified voice commands in response to activation of a control selector, e.g., left control key 91, followed by disabling such functionality in response to a preselected or predetermined time delay. In such case, the functionality can then be reactivated through use of the left control key 91 or through use of an enabling voice command, e.g., "Christine." Similarly, the echo can be initiated for an identified voice command either through release of the left control key 91, or a preselected or predetermined time delay after identifying the voice command.

In an embodiment of the present invention, a computer readable medium that is readable by a vehicle mobile data computer 41 includes a set of instructions that, when executed by the vehicle mobile data computer 41, cause the vehicle mobile data computer 41 to perform the operations of: receiving an audio input from the user through a microphone 63, 97, that may or may not include a voice command representing a vehicle mobile data computer application program command input; and analyzing the received audio input to determine if the audio input includes a voice command from a user. The instructions also include those to perform the operation of rejecting the received audio input as including a voice command from the user after attempting to identify a valid assigned voice command for a preselected or predetermined time period/delay period. The instructions also include those to perform the operation of substantially immediately resuming awaiting receipt of a voice command in response to termination of the delay period.

This functionality advantageously prevents the vehicle mobile data computer 41 from excessively "tying-up" system resources in order to attempt to identify either a false voice command embedded among a noise signal or to identify a valid voice command provided by the user but uttered in such a high noise environment that the voice command signal-to-noise ratio is extremely low, making identification of the voice command extremely difficult and unlikely.

If the audio input was strictly a result of noise, the voice command interface program product 45 is quickly reset to receive a valid voice command. If the audio input included a voice command having a low signal-to-noise ratio, this functionality allows the user to provide an immediate repeat of the valid voice command rather wait through a lengthy delay typically resulting in both an unsuccessful attempt at identifying the voice command and an unnecessary distraction to the user. By quickly resetting to receive either an initial voice command or a repeat of a previously attempted voice command, the user is provided with not only less distraction but increased voice command identification reliability.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims. For example, embodiments of the present invention are described as using phonetic alphabets and Arabic numerals commonly used in United States of America, however, use of other languages and numbering systems are within the scope of the present invention. Also for example, many of the example embodiments were illustrated with respect to communication with law-enforcement. Other uses include providing command, control, and communications between other organizations and include providing command and control input to the vehicle, itself. Further, various embodiments of the present invention can be tailored to function on different or unique computer operating systems.

That claimed is:

1. An apparatus for communicating with law enforcement during remote vehicle operations, the apparatus comprising:
   a remote host computer defining a department server in communication with at least one law enforcement database to supply law enforcement data to officers positioned in vehicles located remote from the department server;
   a vehicle computer positioned within a law enforcement vehicle defining a mobile data computer in communication with the department server and in communication with at least one audio speaker and at least one audio input device and having memory to store data therein;
   a mobile data communications application program stored in the memory of the mobile data computer to facilitate officer communication with the department server through the mobile data computer and to transmit and receive law enforcement data from the at least one law enforcement database through the department server;
   a voice command interface program product stored in the memory of the mobile data computer and in communication with the mobile data communications application program to enhance officer communication with the department server through the mobile data computer, the voice command interface program product including instructions to perform the operations of receiving as audio input a voice command representing a corresponding command input from an officer through the at least one audio input device, identifying the voice command by analyzing the received audio input, echoing the identified voice command through the at least one audio speaker, and transmitting the command input to the mobile data communications application program, the echo including a preselected and prerecorded audio message verbally repeating the identified voice command; and
   a communication enhancing program product stored on the memory of the mobile data computer and in communication with the mobile data communications application program to enhance officer communication with the department server through the mobile data computer, the communications enhancing program product including instructions to perform the operation of transmitting enhanced audio law enforcement data received from the mobile data communications application program to the officer through the at least one audio speaker, the enhanced audio law enforcement data including a plurality of preselected and prerecorded audio messages responsive to the law enforcement data received from the mobile data communications application program.

2. An apparatus as defined in claim 1, wherein the voice command interface program product further includes instructions to perform the operation of transmitting audio data associated with the identified voice command through the at least one audio speaker, the audio data comprising a representation of the identified command in prerecorded human voice.

3. An apparatus as defined in claim 1,
   wherein the received audio input includes a plurality of voice commands representing a corresponding plurality of command inputs;
   wherein the voice command interface program product includes instructions, responsive to a first preselected time delay, to perform the operation of rejecting received audio input as being a voice command from the officer, and resetting to receive another voice command from the officer; and
   wherein the voice command interface program product further includes instructions, responsive to a second preselected time delay, to perform the operation of at least one of the following: disabling receiving audio input from the audio input device, and disabling transmitting the plurality of command inputs to the mobile data communications application program.

4. An apparatus as defined in claim 1,
wherein the received audio input includes a plurality of voice commands;
wherein the mobile data computer includes a mobile data computer to input device having a plurality of control function selectors; and
wherein the apparatus further comprises an initializer accessible by the voice command interface program product and configured to assign a plurality of command terms or phrases defining the plurality of voice commands to a corresponding plurality of mobile data computer input device command inputs for the mobile data communication program, and to assign to each of a subset of the plurality of voice commands prerecorded audio output data to echo the respective voice commands.

5. An apparatus as defined in claim 1,
wherein the received audio input includes a plurality of voice commands representing a corresponding plurality of command inputs, continuous and repetitive noise, and noise caused by reverberation of the plurality of voice commands from adjacent vehicle structures;
wherein the at least one audio input device comprises an array microphone adapted to be connected to a vehicle structure separate and spaced apart from the officer when receiving audio input from the officer and having at least two unidirectional microphone transducers with individual audio channels adapted to provide a directional area of audio input sensitivity having an angle and area of reception, to thereby enhance detection of the plurality of voice commands and to thereby provide the plurality of voice commands from the officer to the mobile data communications application program through the voice command interface program product; and
wherein the apparatus further comprises an audio input processing program product adapted to interface with the array microphone and adapted to provide instructions to perform the operations of attenuating continuous and repetitive noise to thereby reduce voice command recognition latency, and adapted to adjust the area of reception of the audio input to the array microphone to substantially reduce reverberation noise to thereby enhance reception of the plurality of voice commands.

6. An apparatus as defined in claim 1,
wherein the received audio input includes a plurality of voice commands representing a corresponding plurality of command inputs; and
wherein the at least one audio input device comprises a wireless microphone assembly including a microphone and audio speaker adapted to provide wireless audio communication between the mobile data computer and the officer when outside the law enforcement vehicle to transmit the plurality of voice commands from the officer to the mobile data communications application program through the voice command interface program product, to thereby provide command input to the mobile data communications application program, and to receive an audio echo for each of a subset of the plurality of voice commands, to thereby provide the officer verification of correct identification of each respective voice command echoed by the voice command interface program product.

* * * * *

UNITED STATES PATENT AND TRADEMARK OFFICE
CERTIFICATE OF CORRECTION

PATENT NO. : 7,026,957 B2
APPLICATION NO. : 11/083475
DATED : April 11, 2006
INVENTOR(S) : Rubenstein Page 1 of 1

It is certified that error appears in the above-identified patent and that said Letters Patent is hereby corrected as shown below:

| | |
|---|---|
| Column 4. line 56; | change "high-speech" to --high-speed--; |
| Column 7, line 35; | before "provide" insert --to thereby--; |
| Column 7, line 65; | after "environment" insert --between a--; |
| Column 8, line 33; | change "request" to --requested--; |
| Column 8, line 44; | before "user" insert --a--; |
| Column 8, line 46; | after "computer" and before "cause" insert a comma; |
| Column 9, line 34; | before "prerecorded" insert --a-- |
| Column 10, line 3,; | after "such" insert --a--; |
| Column 12, line 44; | delete "a department" (first occurrence); |
| Column 16, line 40; | before "embodiment" insert --an--. |

Signed and Sealed this

Twenty-ninth Day of August, 2006

JON W. DUDAS
*Director of the United States Patent and Trademark Office*